US008797923B2

(12) United States Patent
He et al.

(10) Patent No.: US 8,797,923 B2
(45) Date of Patent: *Aug. 5, 2014

(54) METHOD FOR TRANSMITTING UPLINK SOUNDING REFERENCE SIGNAL FOR LTE SYSTEM

(75) Inventors: Hong He, Beijing (CN); Yingyang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 621 days.

This patent is subject to a terminal disclaimer.

(21) Appl. No.: 13/155,093

(22) Filed: Jun. 7, 2011

(65) Prior Publication Data

US 2012/0063371 A1   Mar. 15, 2012

Related U.S. Application Data

(63) Continuation of application No. 12/542,310, filed on Aug. 17, 2009, now Pat. No. 8,000,273.

(30) Foreign Application Priority Data

Aug. 15, 2008   (CN) .......................... 2008 1 0213230

(51) Int. Cl.
*H04J 3/00*   (2006.01)
*H04W 72/04*   (2009.01)
*H04L 5/00*   (2006.01)

(52) U.S. Cl.
CPC ............ *H04L 5/0048* (2013.01); *H04L 5/0007* (2013.01); *H04L 5/0051* (2013.01)
USPC ....................................................... 370/280

(58) Field of Classification Search
CPC . H04L 25/0226; H04L 25/0224; H04L 5/005; H04L 5/0051; H04L 5/0048; H04W 72/04; H04W 72/1289; H04W 24/02; H04W 28/02

USPC .......................................... 370/276, 277, 280
See application file for complete search history.

(56) References Cited

U.S. PATENT DOCUMENTS 7,990,916 B2 *   8/2011   Muharemovic et al. ...... 370/328
8,509,172 B2 *   8/2013   Liang et al. ................... 370/329

(Continued)

FOREIGN PATENT DOCUMENTS

JP         2008/118619        5/2008
KR      1020080072503        8/2008
WO     WO 2008/087838        7/2008

OTHER PUBLICATIONS

Huawei et al., Remaining Issues on SRS Hopping; 3GPP Draft; R1-082675, 3rd Generation Partnership Project (3GPP) TSG RAN WG1 #53bis, Change Request, Jul. 4, 2008.

(Continued)

*Primary Examiner* — Chi Pham
*Assistant Examiner* — Robert Lopata
(74) *Attorney, Agent, or Firm* — The Farrell Law Firm, P.C.

(57) ABSTRACT

Disclosed are a method and apparatus for transmitting an uplink Sounding Reference Signal (SRS), the method including identifying a number of downlink and uplink switch points within a radio frame $N_{sp}$ and a system frame number $n_f$, calculating a value of $n_{SRS}$ according to a number of downlink and uplink switch points within a radio frame $N_{sp}$, and the system frame number $n_f$ for transmitting the SRS, determining a frequency-domain starting position of the SRS with $n_{SRS}$, and transmitting the SRS at the determined frequency-domain starting position.

28 Claims, 28 Drawing Sheets

(56) References Cited

U.S. PATENT DOCUMENTS

| | | | |
|---|---|---|---|
| 8,537,729 B2* | 9/2013 | Hao et al. ................ | 370/294 |
| 2008/0039098 A1 | 2/2008 | Papasakellariou et al. | |
| 2008/0045260 A1 | 2/2008 | Muharemovic et al. | |
| 2008/0107191 A1 | 5/2008 | Ishii | |
| 2009/0073922 A1 | 3/2009 | Malladi et al. | |
| 2009/0154419 A1 | 6/2009 | Yoshida et al. | |
| 2009/0181687 A1 | 7/2009 | Tiirola et al. | |
| 2009/0238241 A1 | 9/2009 | Hooli et al. | |
| 2009/0274076 A1* | 11/2009 | Muharemovic et al. ...... | 370/280 |
| 2010/0008333 A1 | 1/2010 | Kim et al. | |
| 2010/0040005 A1 | 2/2010 | Kim et al. | |
| 2010/0135273 A1 | 6/2010 | Kim | |
| 2010/0215114 A1* | 8/2010 | Kim et al. ................ | 375/267 |
| 2010/0329220 A1 | 12/2010 | Kim et al. | |
| 2011/0013546 A1* | 1/2011 | Hao et al. ................ | 370/294 |

OTHER PUBLICATIONS

Samsung, "SRS Indication for TDD", 3GPP Draft; R1-081211, 3rd Generation Partnership Project (3GPP) TSG-RAN WG1 #52bis, Mar. 26, 2008.

* cited by examiner

FIG. 6

| Configuration Index $I_{SRS}$ | SRS period (T ms) | SRS sub-frame offset |
|---|---|---|
| 0 - 1 | 2 | $I_{SRS}$ |
| 2 - 6 | 5 | $I_{SRS} - 2$ |
| 7 - 16 | 10 | $I_{SRS} - 7$ |
| 17 - 36 | 20 | $I_{SRS} - 17$ |
| 37 - 76 | 40 | $I_{SRS} - 37$ |
| 77 - 156 | 80 | $I_{SRS} - 77$ |
| 157 - 316 | 160 | $I_{SRS} - 157$ |
| 317 - 636 | 320 | $I_{SRS} - 317$ |
| 637 - 1023 | Reserved | Reserved |

FIG. 7

| Configuration Index $I_{SRS}$ | SRS period (T ms) | SRS sub-frame offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10 - 14 | 5 | $I_{SRS}$ - 10 |
| 15 - 24 | 10 | $I_{SRS}$ - 15 |
| 25 - 44 | 20 | $I_{SRS}$ - 25 |
| 45 - 84 | 40 | $I_{SRS}$ - 45 |
| 85 - 164 | 80 | $I_{SRS}$ - 85 |
| 165 - 324 | 160 | $I_{SRS}$ - 165 |
| 325 - 644 | 320 | $I_{SRS}$ - 325 |
| 645 - 1023 | Reserved | Reserved |

FIG. 8

| Configuration Index $I_{SRS}$ | SRS period (T ms) | SRS sub-frame offset |
|---|---|---|
| 0 | 5 | 0, 1 |
| 1 | 5 | 0, 2 |
| 2 | 5 | 1, 2 |
| 3 | 5 | 0, 3 |
| 4 | 5 | 1, 3 |
| 5 | 5 | 0, 4 |
| 6 | 5 | 1, 4 |
| 7 | 5 | 2, 3 |
| 8 | 5 | 2, 4 |
| 9 | 5 | 3, 4 |
| 10 - 14 | 5 | $I_{SRS}$ - 10 |
| 15 - 24 | 10 | $I_{SRS}$ - 15 |
| 25 - 44 | 20 | $I_{SRS}$ - 25 |
| 45 - 84 | 40 | $I_{SRS}$ - 45 |
| 85 - 164 | 80 | $I_{SRS}$ - 85 |
| 165 - 324 | 160 | $I_{SRS}$ - 165 |
| 325 - 644 | 320 | $I_{SRS}$ - 325 |
| 645 - 1023 | Reserved | Reserved |

FIG. 9A
(PRIOR ART)

| Configuration index $I_{SRS}$ | $n_s$ (in a single radio frame) | $n_{SRS}$ |
|---|---|---|
| 0 | 3,3,13,13 | 0,0,3,3,5,5,8,8,10,10,13,13,15,15,18,18··· |
| 1 | 3,5,13,15 | 0,1,3,3,5,6,8,8,10,11,13,13,15,16,18,18··· |
| 2 | | |
| 3 | 3,7,13,17 | 0,1,3,4,5,6,8,9,10,11,13,14,15,16,18,19··· |
| 4 | | |
| 5 | 3,9,13,19 | 0,2,3,4,5,7,8,9,10,12,13,14,15,17,18,19··· |
| 6 | | |
| 7 | 5,7,15,17 | 1,1,3,4,6,6,8,9,11,11,13,14,16,16,18,19··· |
| 8 | 5,9,15,19 | 1,2,3,4,6,7,8,9,11,12,13,14,16,17,18,19··· |
| 9 | 7,9,17,19 | 1,2,4,4,6,7,9,9,11,12,14,14,16,17,19,19··· |

| Configuration index $I_{SRS}$ | $n_s$ (in a single radio frame) | $n_{SRS}$ |
|---|---|---|
| 0 | 3,3,13,13 | 0,0,1,1,2,2,3,3,4,4,5,5,6,6,7,7······ |
| 1 | 3,5,13,15 | |
| 2 | | |
| 3 | 3,7,13,17 | |
| 4 | | |
| 5 | 3,9,13,19 | |
| 6 | | |
| 7 | 5,7,15,17 | |
| 8 | 5,9,15,19 | |
| 9 | 7,9,17,19 | |

| SRS bandwidth configuration | SRS-bandwidth b = 0 | | SRS-bandwidth b = 1 | | SRS-bandwidth b = 2 | | SRS-bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | N/A | 1 | 4 | 3 |
| 1 | 32 | 1 | 16 | 2 | 8 | 2 | 4 | 2 |
| 2 | 24 | 1 | N/A | 1 | N/A | 1 | 4 | 6 |
| 3 | 20 | 1 | N/A | 1 | N/A | 1 | 4 | 5 |
| 4 | 16 | 1 | N/A | 1 | N/A | 1 | 4 | 4 |
| 5 | 12 | 1 | N/A | 1 | N/A | 1 | 4 | 3 |
| 6 | 8 | 1 | N/A | 1 | N/A | 1 | 4 | 2 |
| 7 | 4 | 1 | N/A | N/A | N/A | N/A | N/A | N/A |

(a) Uplink bandwidth $6 \leq N_{RB}^{UL} \leq 40$

FIG. 13B

| SRS bandwidth configuration | SRS-bandwidth b = 0 | | SRS-bandwidth b = 1 | | SRS-bandwidth b = 2 | | SRS-bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | N/A | 1 | 4 | 5 |
| 3 | 36 | 1 | 12 | 3 | N/A | 1 | 4 | 3 |
| 4 | 32 | 1 | 16 | 2 | 8 | 2 | 4 | 2 |
| 5 | 24 | 1 | N/A | 1 | N/A | 1 | 4 | 6 |
| 6 | 20 | 1 | N/A | 1 | N/A | 1 | 4 | 5 |
| 7 | 16 | 1 | N/A | 1 | N/A | 1 | 4 | 4 |

(b) Uplink bandwidth $40 \leq N_{RB}^{UL} \leq 60$

FIG. 13C

| SRS bandwidth configuration | SRS-bandwidth b = 0 | | SRS-bandwidth b = 1 | | SRS-bandwidth b = 2 | | SRS-bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | N/A | 1 | 4 | 5 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | N/A | 1 | 4 | 5 |
| 6 | 36 | 1 | 12 | 3 | N/A | 1 | 4 | 3 |
| 7 | 32 | 1 | 16 | 2 | 8 | 2 | 4 | 2 |

(c) Uplink bandwidth $60 \leq N_{RB}^{UL} \leq 80$

FIG. 13D

| SRS bandwidth configuration | SRS-bandwidth b = 0 | | SRS-bandwidth b = 1 | | SRS-bandwidth b = 2 | | SRS-bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | N/A | 1 | 4 | 5 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | N/A | 1 | 4 | 5 |
| 6 | 36 | 1 | 12 | 3 | N/A | 1 | 4 | 3 |
| 7 | 32 | 1 | 16 | 2 | 8 | 2 | 4 | 2 |

(c) Uplink bandwidth $60 \leq N_{RB}^{UL} \leq 80$

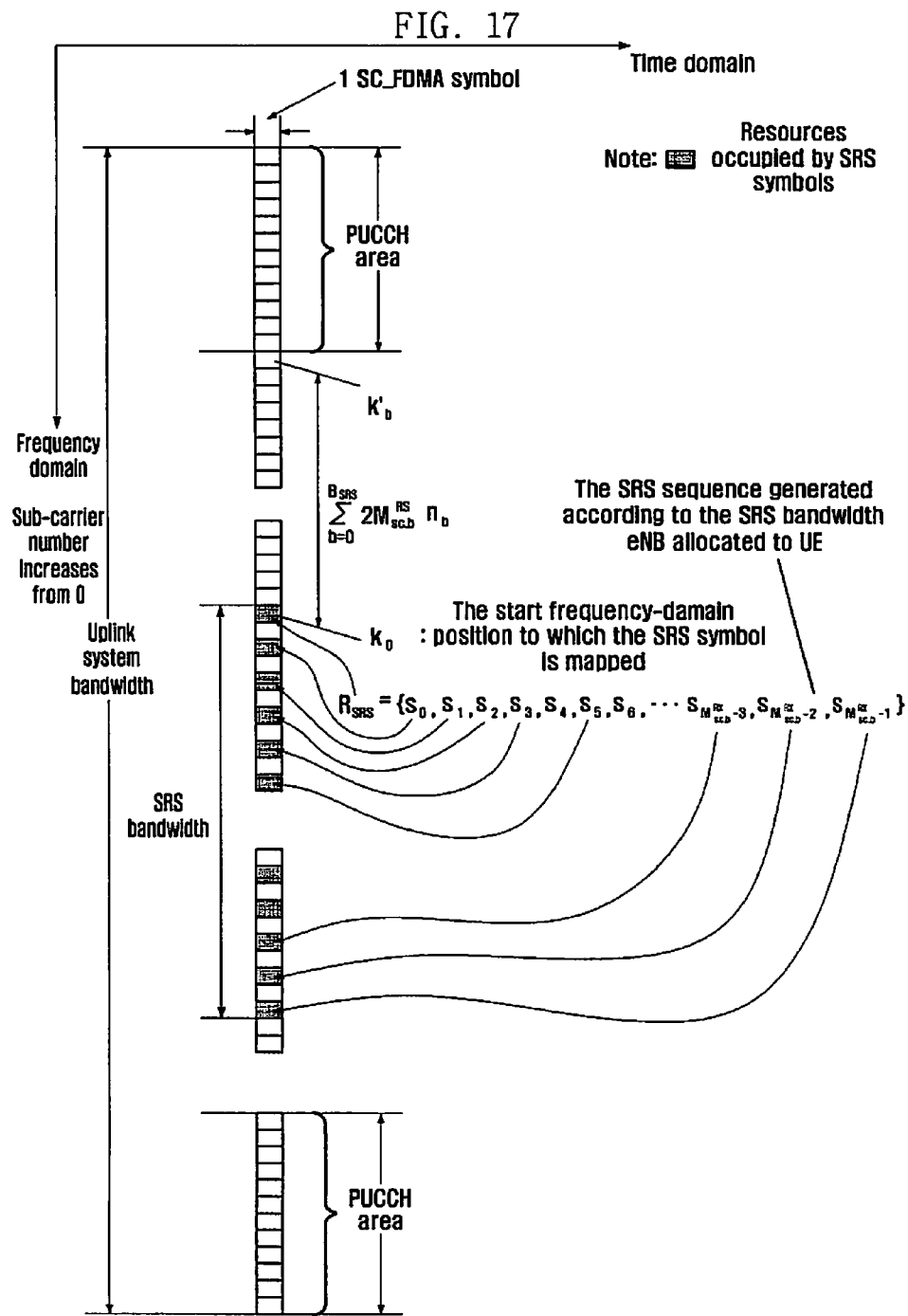

METHOD FOR TRANSMITTING UPLINK SOUNDING REFERENCE SIGNAL FOR LTE SYSTEM

PRIORITY

This application claims priority under 35 U.S.C. §119(a) to a Chinese application filed in the State Intellectual Property Office of China on Aug. 15, 2008 and assigned Serial No. 200810213230.0, and is a continuation application of U.S. patent application Ser. No. 12/542,310, filed Aug. 17, 2009, the contents of each of which are incorporated herein by reference.

BACKGROUND OF THE INVENTION

1. Field of the Invention

The present invention relates generally to a wireless communication system, and more particularly, to a device and method for transmitting uplink sounding reference signals for a wireless communication system.

2. Description of the Related Art

An objective of the Third Generation Partnership Project (3GPP) standardization organization is to establish a new generation of communication standard, known as the Long Term Evolution (LTE) standard. The downlink transmission technique of LTE is based on Orthogonal Frequency Division Multiplexing (OFDM), while the uplink transmission technique is based on a Single Carrier Frequency Division Multiple Access (SCFDMA) scheme. There are two types of frame structures in the LTE system, wherein type 1 applies Frequency Division Duplex (FDD) and type 2 applies Time Division Duplex (TDD).

FIG. 2 illustrates a frame structure in the LTE FDD system where time duration of a radio frame is $307200 \times T_s = 10$ ms and each frame is divided into 20 time slots $15360 \, T_s = 0.5$ ms long which cover the index ranging from 0 to 19. Each time slot includes several OFDM symbols and use a Cyclic Prefix (CP) of one of two types, i.e., normal CP and extended CP. Time slots using normal CP include seven OFDM symbols while the time slots using extended CP have six OFDM symbols. Each sub-frame consists of two continuous time slots, i.e., the $k^{th}$ sub-frame includes the $2k^{th}$ and $(2k+1)^{th}$ time slots.

FIG. 3 illustrates a frame structure in the LTE TDD system. A radio frame having a length of $307200 \times T_s = 10$ ms is divided into two equal half-frames $153600 \times T_s = 5$ ms long. Each half-frame includes eight $15360 T_s = 0.5$ ms long slots and three special domains, i.e., a Downlink Pilot Time Slot (DwPTS), a Guard Period (GP) and an Uplink Pilot Time Slot (UpPTS), and has a total length of $30720 T_s = 1$ ms. Each time slot includes several OFDM symbols and use either the normal CP or the extended CP. Time slots using normal CP include 7 OFDM symbols while the time slots using extended CP have 6 OFDM symbols.

Each sub-frame consists of two continuous time slots, i.e., the $k^{th}$ sub-frame includes the $2k^{th}$ and $(2k+1)^{th}$ time slots. Sub-frame 1 and 6 include the aforementioned three domains. To this point, sub-frames 0, 5 and DwPTS are constantly assigned for downlink transmission. If the conversion period is 5 ms, UpPTS, sub-frames two and seven are constantly assigned for uplink transmission. If the conversion period is 10 ms, UpPTS and sub-frame 2 are constantly assigned for uplink transmission.

FIG. 4 illustrates a configuration diagram of an LTE TDD frame structure. In FIG. 4, it can be clearly seen that in configuration 0, each radio frame contains ten radio sub-frames that are circularly indexed from 0. Both sub-frames 0 and 5 are adopted to transmit downlink data, i.e., both sub-frames 0 and 5 are adopted by evolved Node B (eNB) to transmit information to UEs, Sub-frames 2, 3, 7, 8 and 9 are adopted by UEs to transmit uplink data, i.e., to transmit information to the eNB, and Sub-frames 1 and 6, also known as special sub-frames, are composed of three special time slots defined as DwPTS, GP and UpPTS respectively. Here, the time length of DwPTS, GP and UpPTS is variable depending on the system configuration.

FIG. 5 illustrates a distribution diagram of the time-frequency grid of a single uplink sub-frame and a possible location of the time-frequency resource for the Sounding Reference Signal (SRS) transmission under the condition that the normal CP and the extended CP are configured in an LTE system. When the system is configured with normal CPs, each uplink sub-frame within a Resource Block (RB) contains two time slots with each containing 7 Single Carrier Frequency Division Multiple Access (SC-FDMA) symbols (the time domain) and 12 sub-carriers (the frequency domain). When the system is configured with extended CPs, each uplink sub-frame within each RB contains two continuous time slots containing 6 SC-FDMA symbols and 12 sub-carriers. The minimum uplink sub-frame resource is called the Resource Element (RE).

According to present discussion on LTE, in each radio frame, the last symbol in some sub-frame is adopted to transmit the SRS.

An objective of LTE on an uplink SRS is for the SRS frequency-hop scheme to guarantee that the SRS signal from the UE for the entire system bandwidth is as loudly as possible. At present, with the provision of SRS for four different system bandwidth configurations, eNB adopts 8-bit Radio Resource Control (RRC) signaling to assign the UE with different frequency-hop schemes. Among the 8-bit RRC signaling, four bits are adopted to indicate the configuration of SRS bandwidth, two bits are adopted to indicate the UE's SRS bandwidth in current configuration, and the remaining two bits are adopted to indicate SRS frequency-hop bandwidth.

To avoid collision among SRSs of different UEs within the same frequency-hop period (T), the same transmission sub-frame offset and the same Comb location, when a UE configures the SRS frequency hop, the SRS's logic IDentifier (ID) ($n_{SRS}$) is calculated according to a current radio frame number ($n_f$), an index ($n_s$) of the time slot for transmitting the SRS and the SRS period (T), by Equation (1) as follows:

$$n_{SRS} = \lfloor (n_f \times 10 + \lfloor n_s/2 \rfloor)/T \rfloor \quad (1)$$

The physical resource for each transmission of SRS is then determined based on $n_{SRS}$. When $n_{SRS}$ is a continuous value, according to the present SRS frequency-hop scheme, the UE can be guaranteed to sound the entire system bandwidth as loudly as possible. In an FDD system, since frequency division multiplex is applied in both uplink and downlink, it can be guaranteed that in each SRS period at least one uplink sub-frame is allocated by eNB. Therefore, $n_{SRS}$ obtained by Equation (1) is a continuous value. This guarantees that the SRS could sound the entire system bandwidth.

However, in a TDD system's frame structure, it cannot be guaranteed that at least one uplink sub-frame is allocated in every two continuous sub-frames. Thus, when a UE is configured with a 2 ms period, $n_{SRS}$ obtained by Equation (1) is not continuous in a TDD system, which results in that the UE is not able to sound the entire system bandwidth or that the frequency-hop pattern is not uniform within the sounding frequency-hop bandwidth.

FIGS. 9A and 9B illustrate the values of $n_{SRS}$ obtained by Equation (1) when T=2 (in FIG. 9A) and 5 respectively. FIG. 10 illustrates the problems in the current system when the system bandwidth=25RB, the SRS frequency-hop index=3, the SRS bandwidth=4 and the SRS frequency-hop bandwidth=20. Since seven different uplink and downlink configurations can be applied in a TDD system, the new frequency-hop scheme should guarantee that within any SRS configuration period in either TDD or FDD system, the UE could periodically sound the entire SRS frequency-hop bandwidth with a fixed period, and the frequency-hop pattern should be uniformly distributed over the frequency-hop bandwidth, i.e., the sounding frequency for each SRS bandwidth should be as consistent as possible. As indicated in FIGS. 9A and 9B, the SRS only sounds a part of the bandwidth or the numbers of sounding for the bandwidths are not equal, regardless of the value of T.

At present, there is no LTE discussion underway on how to solve the complicated problem of all-around consideration on the seven different uplink and downlink configurations.

SUMMARY OF THE INVENTION

An object of the invention is to provide a frequency-hop method for transmitting uplink signal, particularly for transmitting an uplink sounding signal.

According to an aspect of the present invention, a method for transmitting an uplink Sounding Reference Signal (SRS) is provided, with the method including identifying a number of downlink and uplink switch points within a radio frame, $N_{sp}$, and a system frame number $n_f$; calculating a value of $n_{SRS}$ according to the number of downlink and uplink switch points within a radio frame $N_{sp}$, and the system frame number $n_f$ for transmitting the SRS; determining a frequency-domain starting position of the SRS with $n_{SRS}$; and transmitting the SRS at the determined frequency-domain starting position.

According to another aspect of the present invention, a User Equipment (UE) for transmitting an uplink Sounding Reference Signal (SRS) is provided, with the UE including an SRS sequence generator for generating SRS sequence; a physical resource mapper for transmitting the SRS; and a transmitter for transmitting the SRS at the determined frequency-domain starting position, wherein the physical resource mapper is sequentially performs: identifying a number of downlink and uplink switch points within a radio frame, $N_{sp}$, and a system frame number $n_f$; calculating a value of $n_{SRS}$ according to the number of downlink and uplink switch points within a radio frame $N_{sp}$, and the system frame number $n_f$ for transmitting the SRS; and determining a frequency-domain starting position of the SRS with $n_{SRS}$.

According to yet another aspect of the present invention, a method for receiving an uplink Sounding Reference Signal (SRS) is provided, the method including identifying a number of downlink and uplink switch points within a radio frame, $N_{sp}$, and a system frame number $n_f$; calculating a value of $n_{SRS}$ according to the number of downlink and uplink switch points within a radio frame $N_{sp}$, and the system frame number $n_f$ for transmitting the SRS; determining a frequency-domain starting position of the SRS with $n_{SRS}$; and receiving the SRS at the determined frequency-domain starting position.

According to a further aspect of the present invention, a base station is provided for receiving an uplink Sounding Reference Signal (SRS), the base station including an SRS sequence generator for generating SRS sequence; a physical resource mapper for transmitting the SRS; and a receiver for receiving the SRS at the determined frequency-domain starting position, wherein the physical resource mapper is sequentially performs steps of identifying a number of downlink and uplink switch points within a radio frame, $N_{sp}$, and a system frame number $n_f$; calculating a value of $n_{SRS}$ according to the number of downlink and uplink switch points within a radio frame $N_{sp}$, and the system frame number $n_f$ for transmitting the SRS; and determining a frequency-domain starting position of the SRS with $n_{SRS}$.

BRIEF DESCRIPTION OF THE DRAWINGS

FIG. 6 illustrates a UE SRS configuration table in an FDD system;

FIG. 7 illustrates a first embodiment of a UE SRS configuration table in a TDD system;

FIG. 8 illustrates a second embodiment of a UE SRS configuration table in a TDD system;

FIGS. 9A and 9B illustrate a problem to be solved;

FIGS. 13A through 13D illustrate an SRS bandwidth configuration for different uplink bandwidths;

FIG. 17 illustrates an SRS signal resource mapping diagram; and

DETAILED DESCRIPTION OF THE PREFERRED EMBODIMENTS

Hereinafter, preferred embodiments of the present invention are described in detail with reference to the accompanying drawings. The same reference numbers are used throughout the drawings to refer to the same or similar parts. Detailed descriptions of well-known functions and structures incorporated herein may be omitted for the sake of clarity and conciseness.

Figure 1:
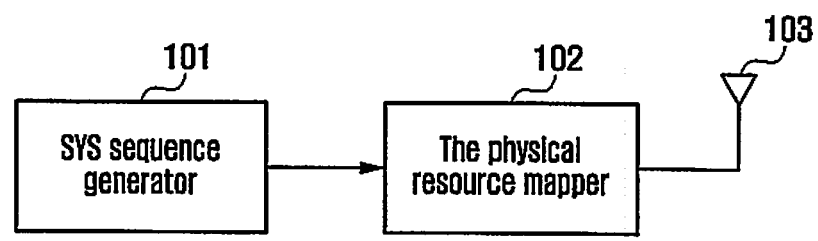
FIG. 1 illustrates a block diagram of a structure according to the present invention.
Figure 2:
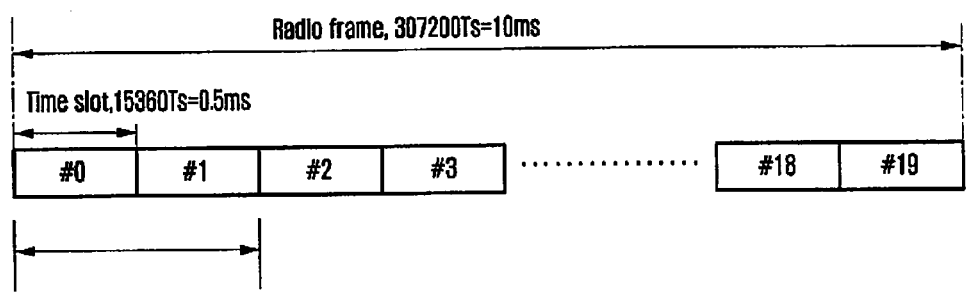
FIG. 2 illustrates a conventional LTE FDD frame structure.
Figure 3:
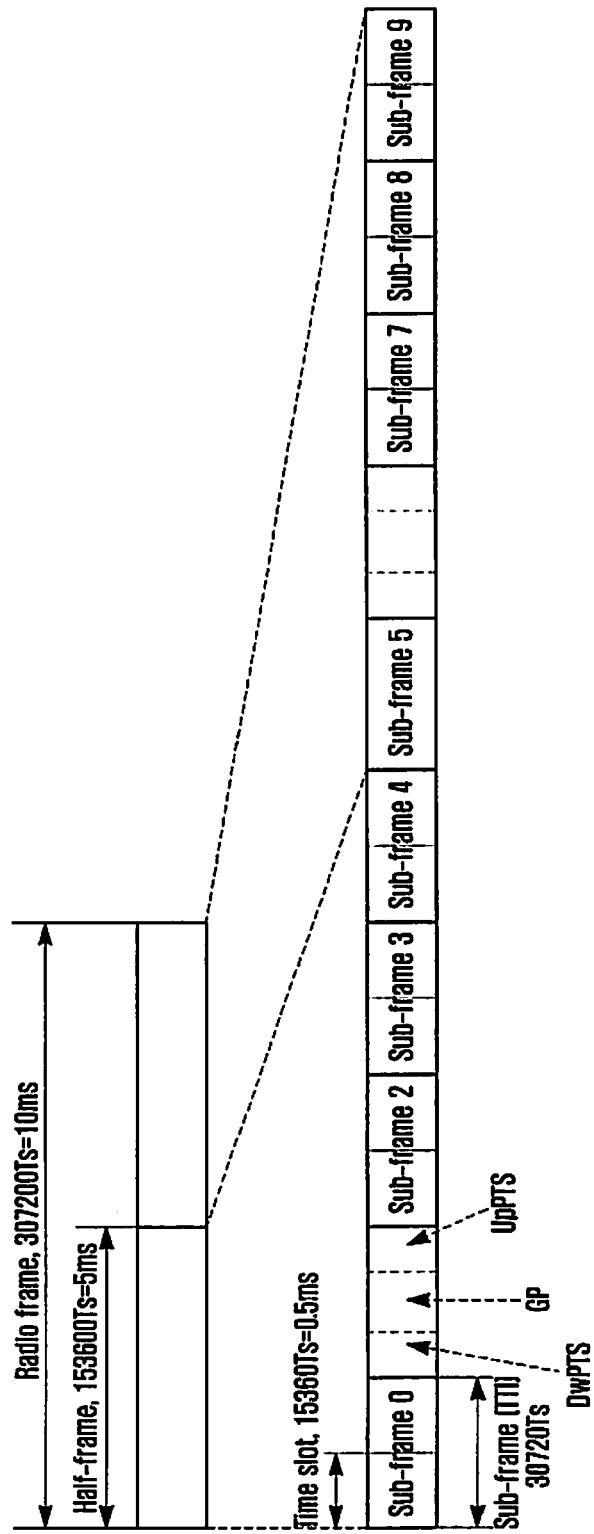
FIG. 3 illustrates a conventional LTE TDD frame structure.

FIG. 1 illustrates a system block diagram according to the present invention. The system includes an SRS sequence generator 101 which generates a Zadoff-chu sequence to be transmitted according to the SRS bandwidth indicator transmitted with RRC signaling from an eNB, a physical resource mapper 102 which determines the SRS frequency-hop pattern according to the SRS parameters (transmitted with the 11-bit RRC signaling from eNB) such as an SRS period T, a sub-frame offset (as shown in FIGS. 7 and 8) and an index number $n_f$ of the current radio frame, and maps the SRS sequence to corresponding physical Resource Elements (REs) according to the generated frequency-hop pattern, and generates SC-FDMA symbols to be transmitted through Inverse Fast Fourier Transform (IFFT). Further included in the system are antennas which transmit the RF (Radio Frequency) signal output from the radio transmitter in a form of electro-magnetic waves.

The system according to the present invention relates to the physical resource mapper 102 shown in FIG. 1.

Figure 14A:
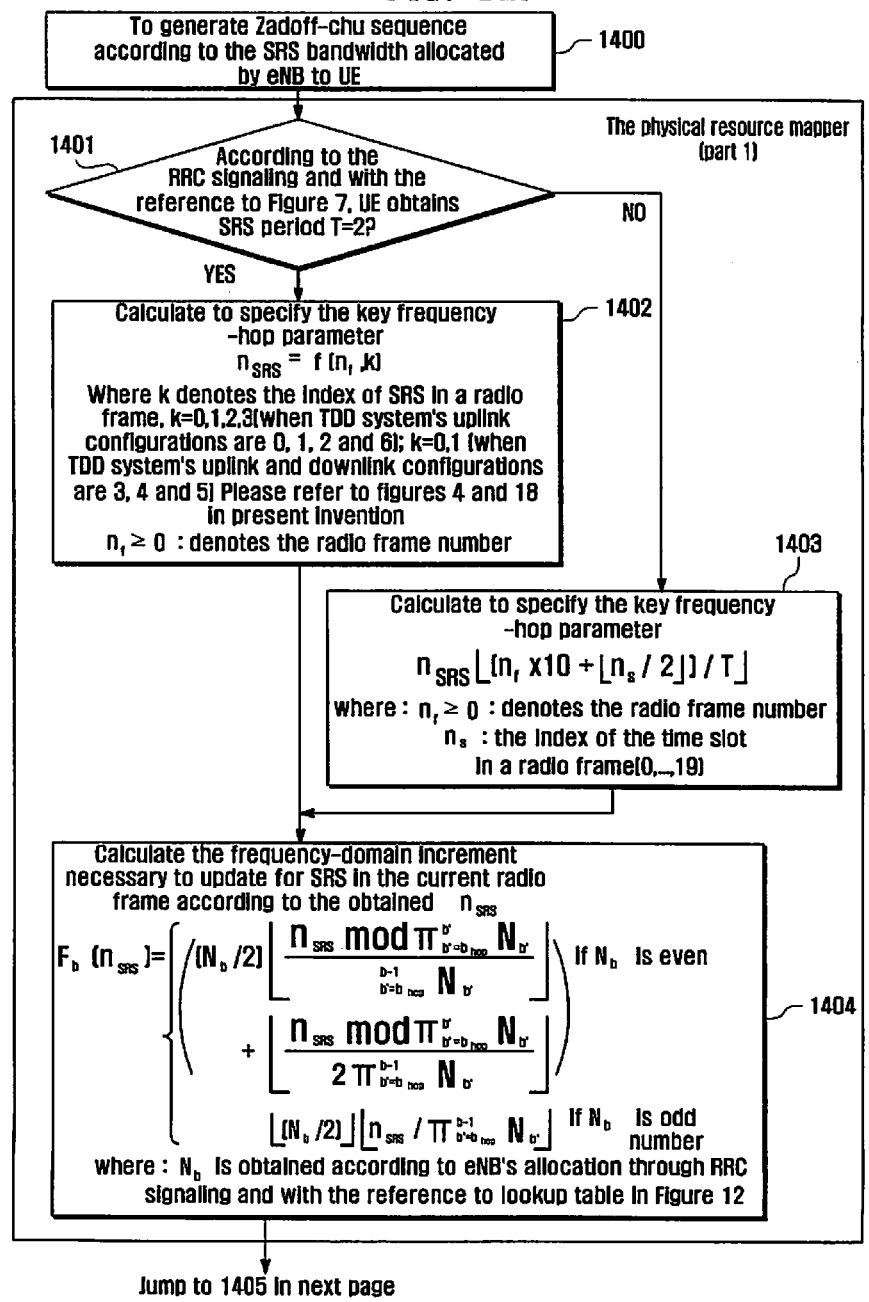
FIGS. 14A and 14B illustrate a frequency-hop method applied in a TDD system when the UE's SRS configuration table of FIG. 7 is adopted.

FIGS. 14A and 14D illustrate an SRS frequency-hopping method according to present invention, which is suitable for the UE SRS configuration table for the TDD system shown in FIG. 7. According to this method, in step 1400 the UE generates the SRS reference symbol sequence according to the SRS bandwidth parameter (allocated by the eNB through RRC signaling) and the cyclic shift parameter.

In step 1401 the UE determines whether the SRS period (allocated by eNB for UE) is 2, i.e., the UE reads out a value of $I_{SRS}$ (the SRS period, which is transmitted from the eNB through RRC signaling). If $0 \leq I_{SRS} \leq 9$, the method proceeds to step 1402; otherwise, the method proceeds to step 1403.

Figure 4:
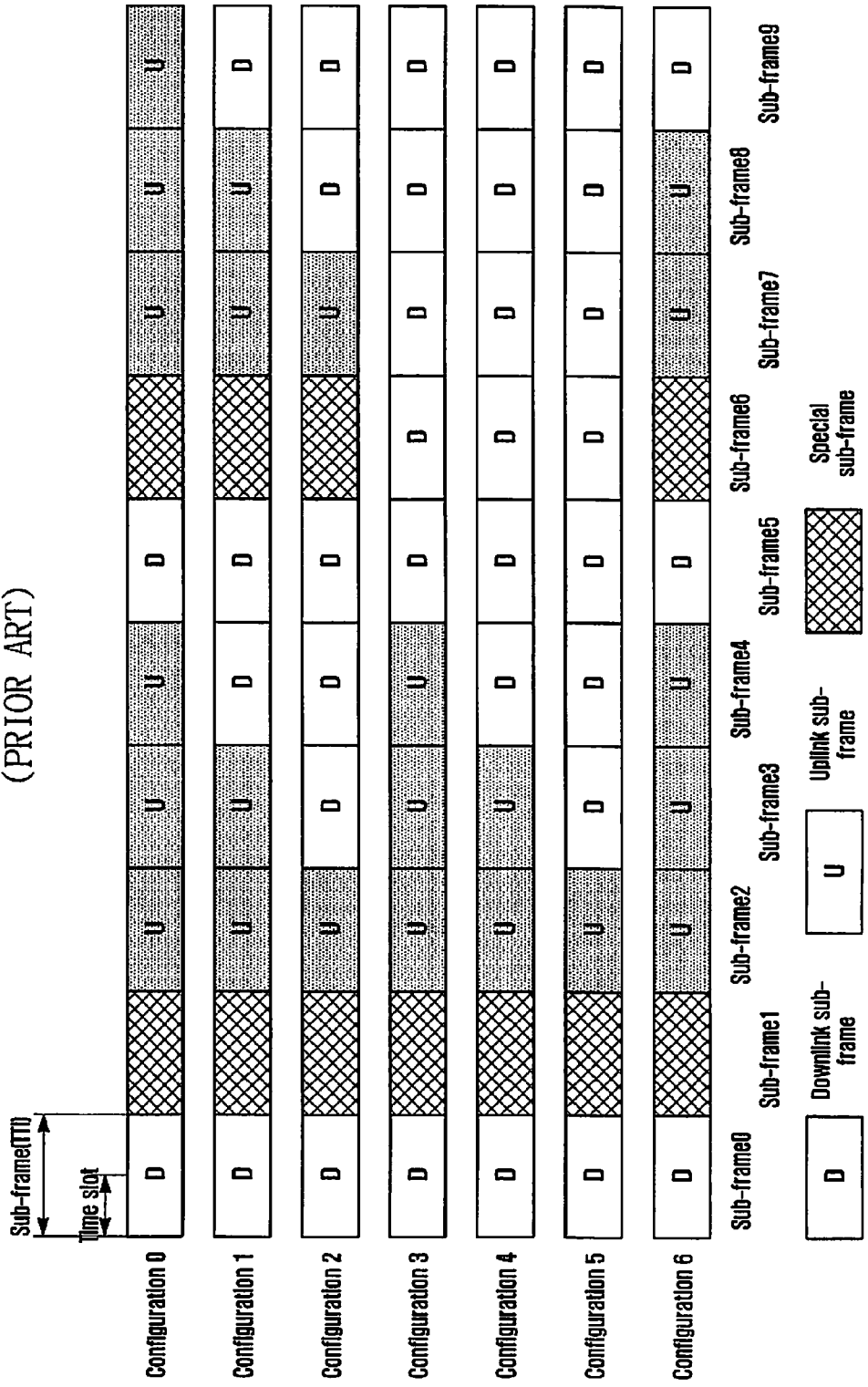
FIG. 4 illustrates conventional uplink and downlink configurations for the LTE TDD system.
Figure 5:
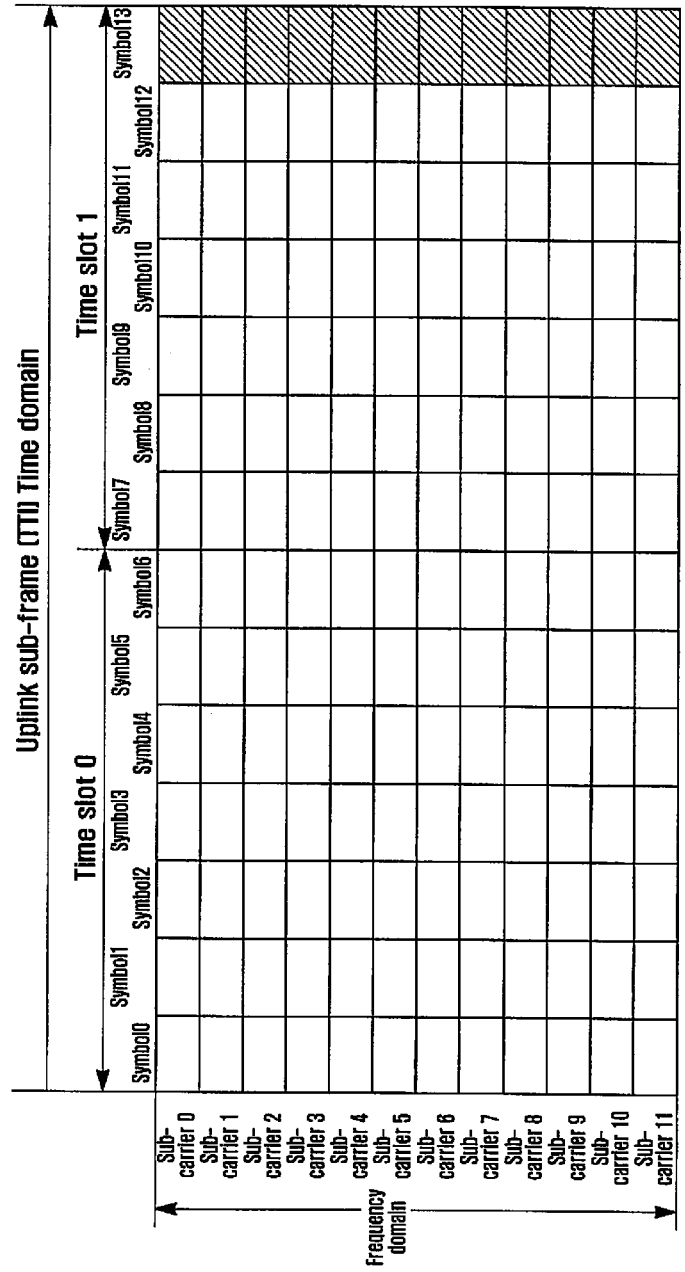
FIG. 5 illustrates a conventional structure of an LTE uplink sub-frame for transmitting the SRS.
Figure 10:
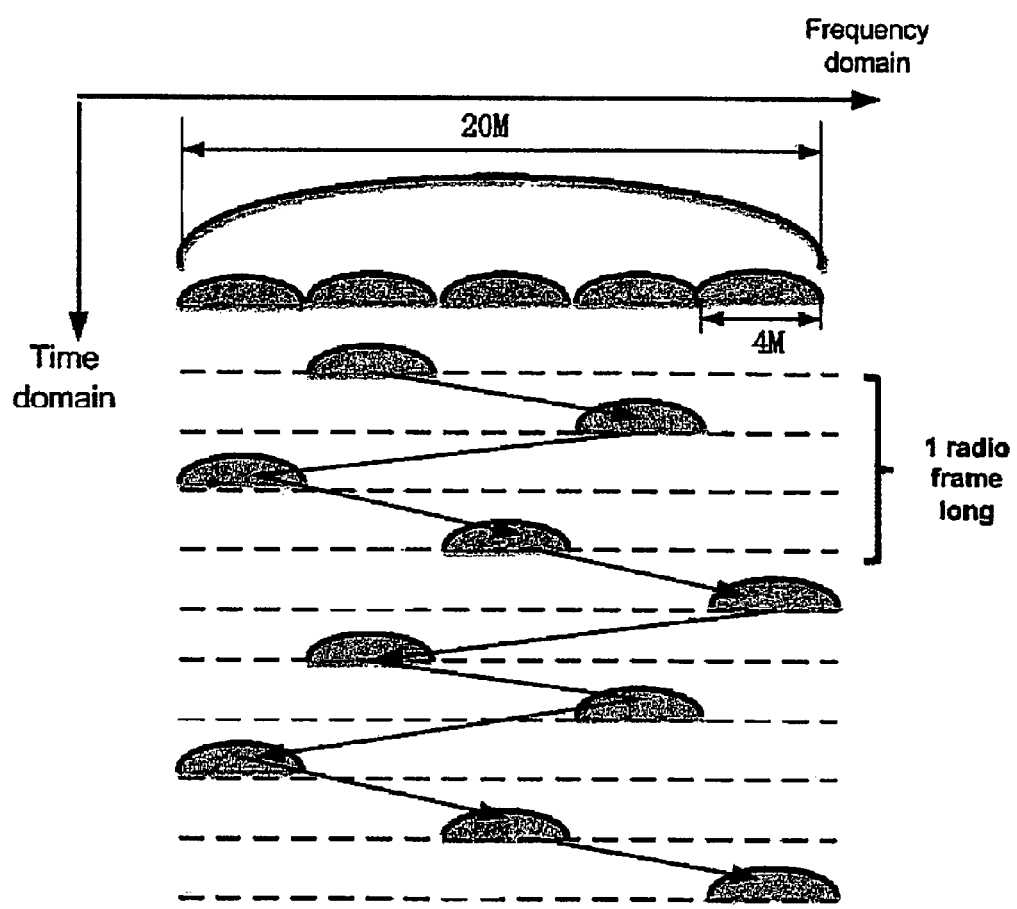
FIG. 10 illustrates an ideal SRS frequency-hop pattern.
Figure 11:
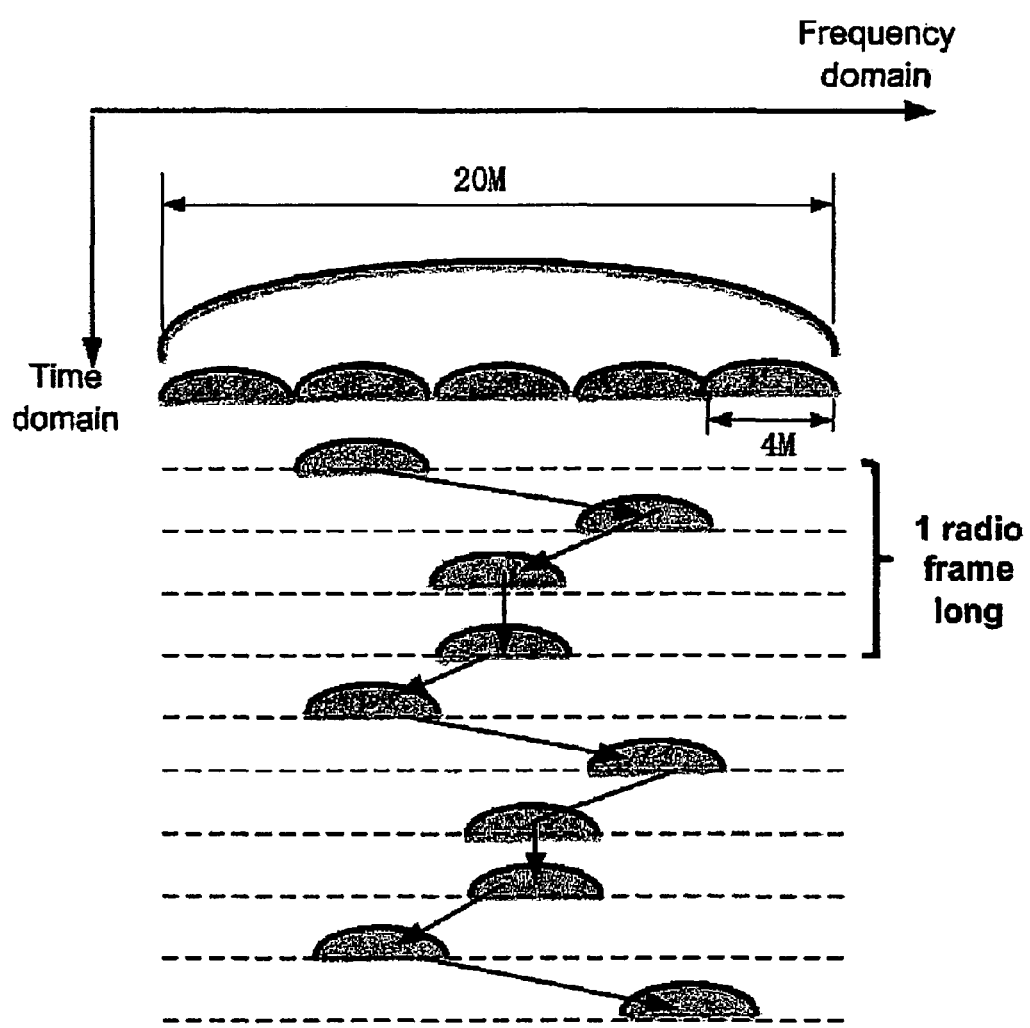
FIG. 11 illustrates an SRS frequency-hop pattern when T=2.
Figure 12:
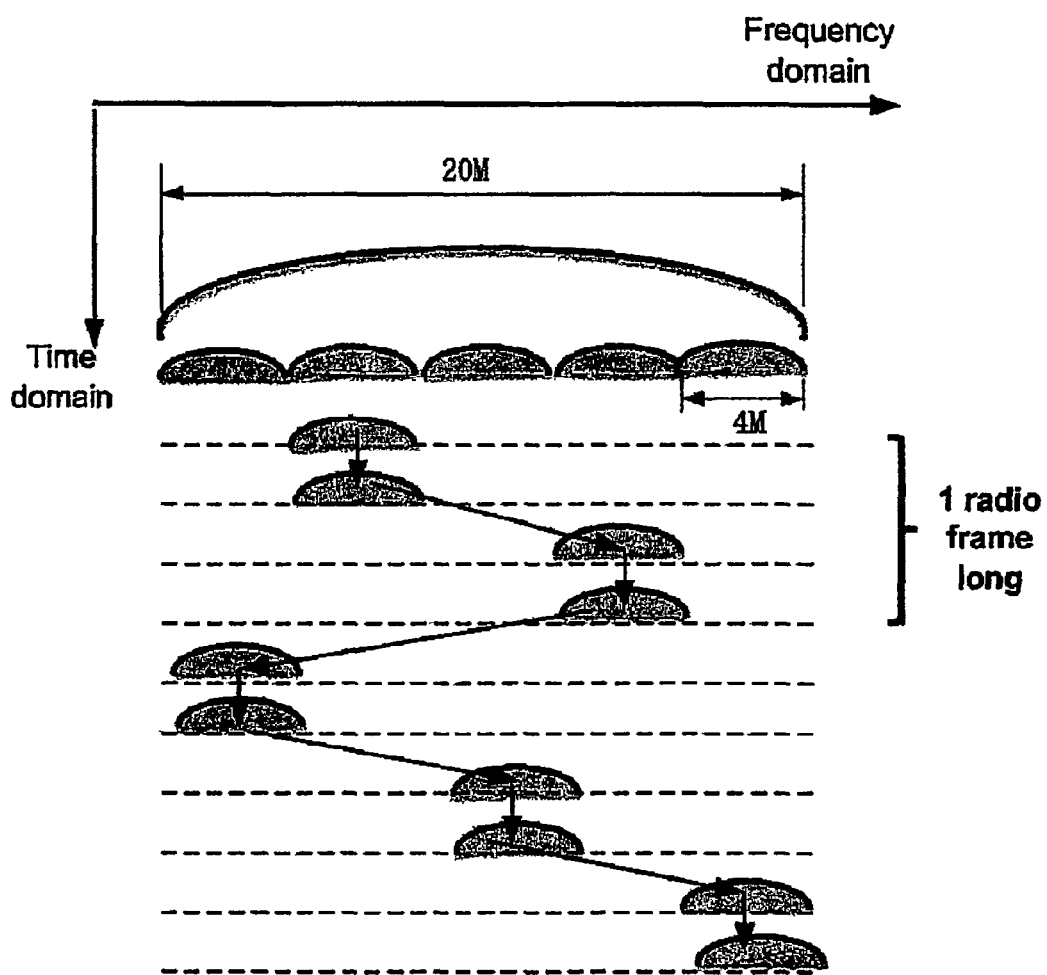
FIG. 12 illustrates an SRS frequency-hop pattern when T=5.

In step 1402 the UE determines the frequency-hop pattern parameter $n_{SRS}$ according to the index number $n_f$ of the radio frame for transmitting the SRS signal, and the index number k of the SRS in the SRS sequence within the radio frame. The requirements for determining the parameter are to avoid collision between SRSs from different UEs but with the same SRS period, the same sub-frame offset and the same Comb index number, and for $n_{SRS}$ to be continuous with the index number k of the SRS in the SRS sequence within the radio frame and the different uplink and downlink sub-frame configurations (as shown in FIG. 4) in a TDD system so that the UE can sound the entire SRS frequency-hop bandwidth allocated by the eNB.

By these requirements, it can be concluded that $n_{SRS}=f(n_f, k)$. Here, the implementation mode cannot be confined within the mapping method of Equation (2):

$$n_{SRS} = n_f \times L + k \quad (2)$$

By Equation 2, if the configurations for the uplink and downlink in the TDD system are 0, 1, 2 and 6, then k=0, 1, 2 and 3, L=4, and if the configurations for the uplink and downlink in the TDD system are 3, 4 and 5, then k=0, 1; L=2. k is indexed in ascending order, i.e., the first SC-FDMA symbol in each radio frame for transmitting the SRS corresponds to k=0, the second SC-FDMA symbol in each radio frame for transmitting the SRS corresponds to k=1, the third SC-FDMA symbol in each radio frame for transmitting the SRS corresponds to k=2, the fourth SC-FDMA symbol in each radio frame for transmitting the SRS corresponds to k=3, and $n_f$ denotes the index number of radio frame and $n_f \geq 0$.

Other methods for deriving a continuous $n_{SRS}$ according to different values of k may be used as long as the same principles as the foregoing are applied.

In step 1403 the UE determines the frequency-hop parameter $n_{SRS}$ according to the index number $n_f$ of the radio frame for transmitting the SRS, and the index number $n_s$ of time slot in the radio frame for transmitting the SRS, i.e., by Equation (3) as follows:

$$n_{SRS} = \lfloor (n_f \times 10 + \lfloor n_s/2 \rfloor)/T \rfloor \quad (3)$$

In Equation (3), $n_f \geq 0$ denotes the index number of radio frame, $n_s$ denotes the index number of the time slot in the radio frame for transmitting the SRS, $0 \leq n_s \leq 19$, and according to the RRC signaling from the eNB, the UE determines T and $n_s$ based on the contents in FIG. 7, and $5 \leq T \leq 320$.

In step 1404 the frequency-domain increment is calculated and updated by the SRS within the frame according to the obtained $n_{SRS}$, i.e., by Equation (4) as follows:

$$F_b(n_{SRS}) = \quad (4)$$

$$\begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

In Equation (4), $N_b$ is obtained according to the RRC signaling from the eNB and with reference to FIGS. 13A through 13D, and $b_{hop}$ denotes SRS frequency-hop bandwidth parameter, $0 \leq b_{hop} \leq 3$, which the UE obtains by reading the RRC signaling from the eNB.

In step 1405, the index number $n_b$ frequency-domain location is calculated for transmitting the SRS according to the obtained $F_b(n_{SRS})$, by Equation (5) as follows:

$$n_b = \begin{cases} \lfloor 4n_{RRC}/m_{SRS,b} \rfloor & b \leq b_{hop} \\ \{F_b(n_{SRS}) + \lfloor 4n_{RRC}/m_{SRS,b} \rfloor\} \bmod N_b & \text{else} \end{cases} \quad (5)$$

In Equation (5), $m_{SRS,b}$, $b_{hop}$, $n_{RRC}$ are the parameters that the UE obtains by reading the RRC signaling from the eNB.

In step 1406 the start frequency-domain position $k_0$ is calculated for transmitting the SRS, by Equation (6) as follows:

$$k_0' = (\lfloor N_{RB}^{UL}/2 \rfloor - m_{SRS,0}/2) N_{SC}^{RB} + k_{TC} \quad (6)$$

$$k_0 = k_0' + \sum_{b=0}^{B_{SRS}} 2 M_{sc,b}^{RS} n_b$$

$$M_{sc,b}^{RS} = m_{SRS,b} N_{sc}^{RB}/2$$

In Equation (6), $m_{SRS,0}$ is obtained from the 3-bit cell-specific SRS parameter broadcast by the eNB, $m_{SRS,b}$ is allocated by the eNB through RRC signaling and with reference to the lookup table in FIGS. 13A through 13D, $N_{sc}^{RB}=12$ denotes the number of sub-carriers in each RB, $k_{TC} \in \{0,1\}$ denotes the Comb number, and $N_{RB}^{UL}$ denotes the number of frequency-domain RBs in the uplink sub-frame.

In step 1407 the SRS sequence is mapped to sub-carriers numbered starting from $k_0$. The detailed mapping approach is shown in FIG. 17.

In step 1408 the frequency-domain symbols obtained by using IFFT are mapped to time-domain symbols, and then are transmitted through antennas.

Figure 15A:
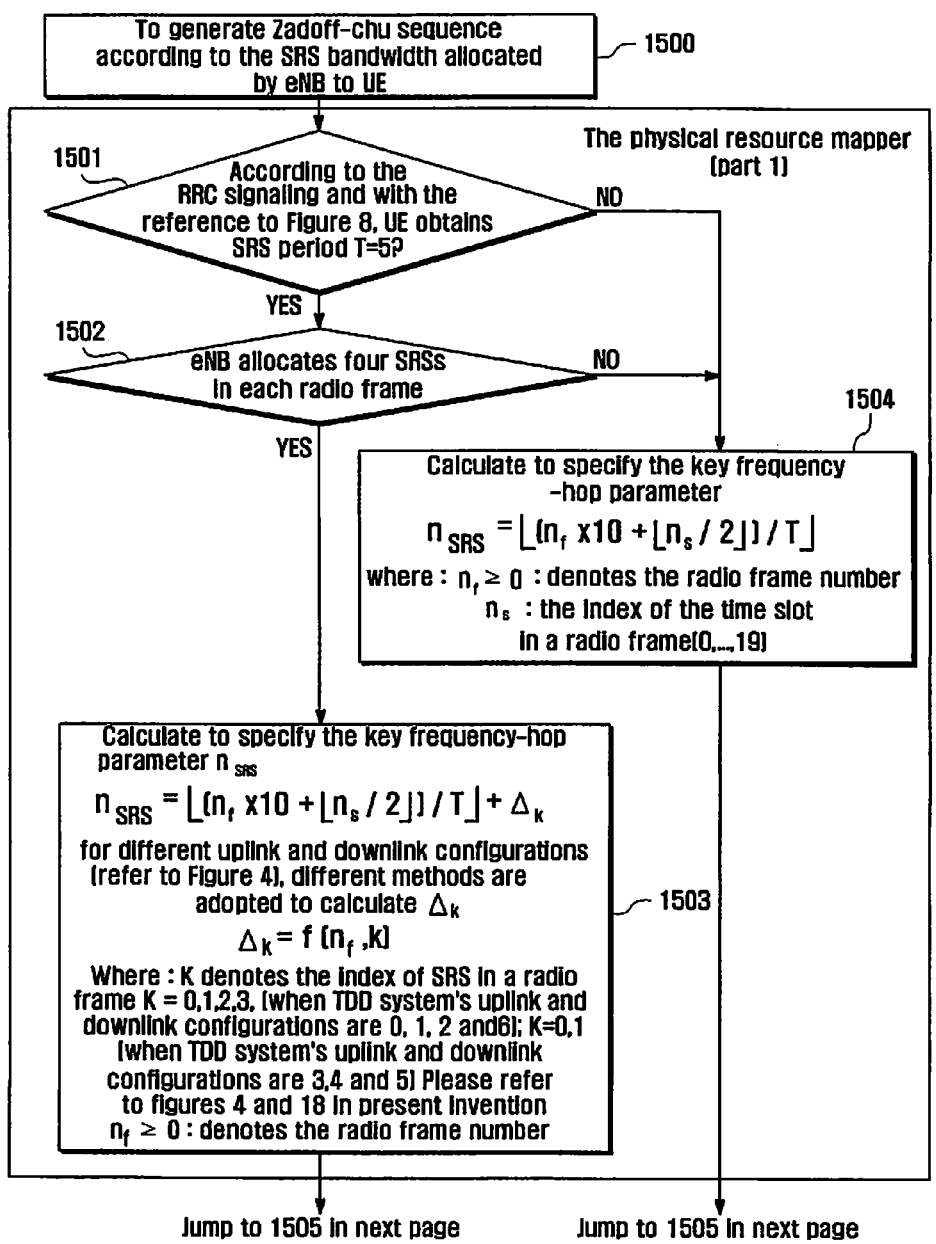
FIGS. 15A through 15C illustrate a frequency-hop method applied in a TDD system when the UE's SRS configuration table of FIG. 8 is adopted.
Figure 15B:
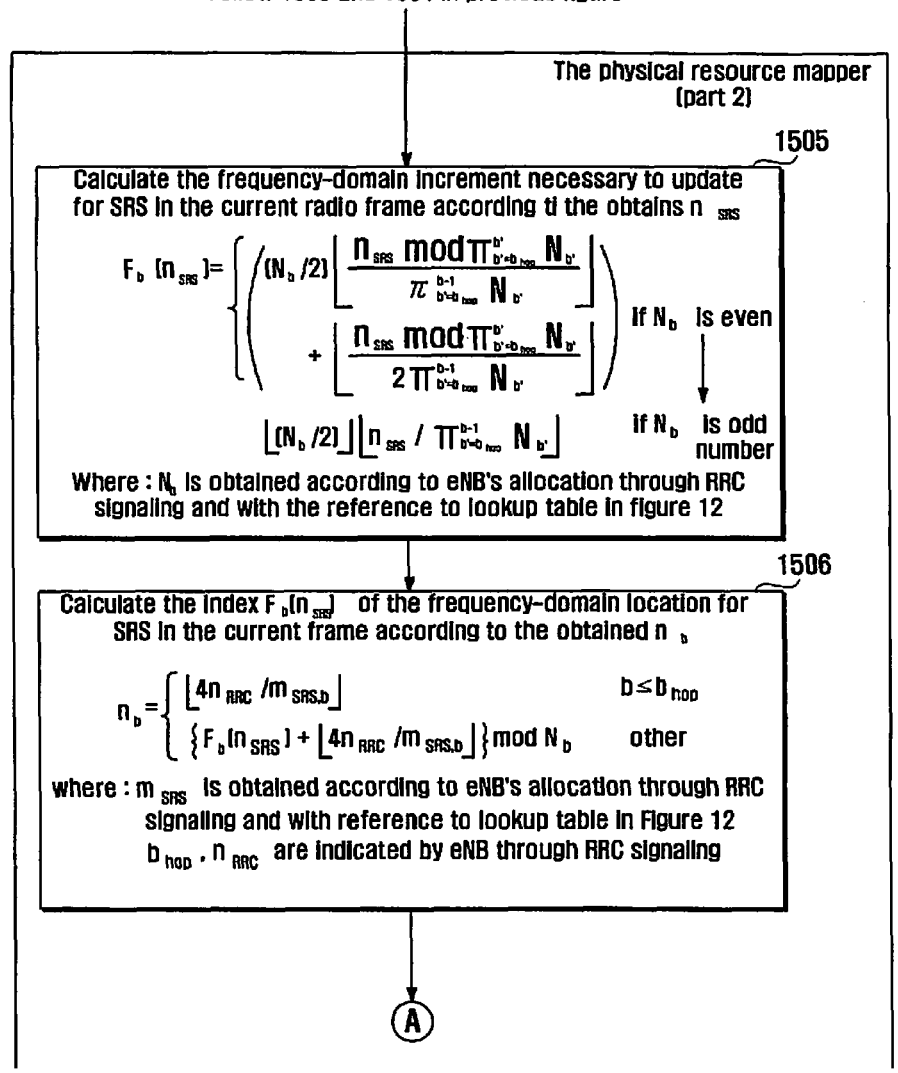
Figure 15C:
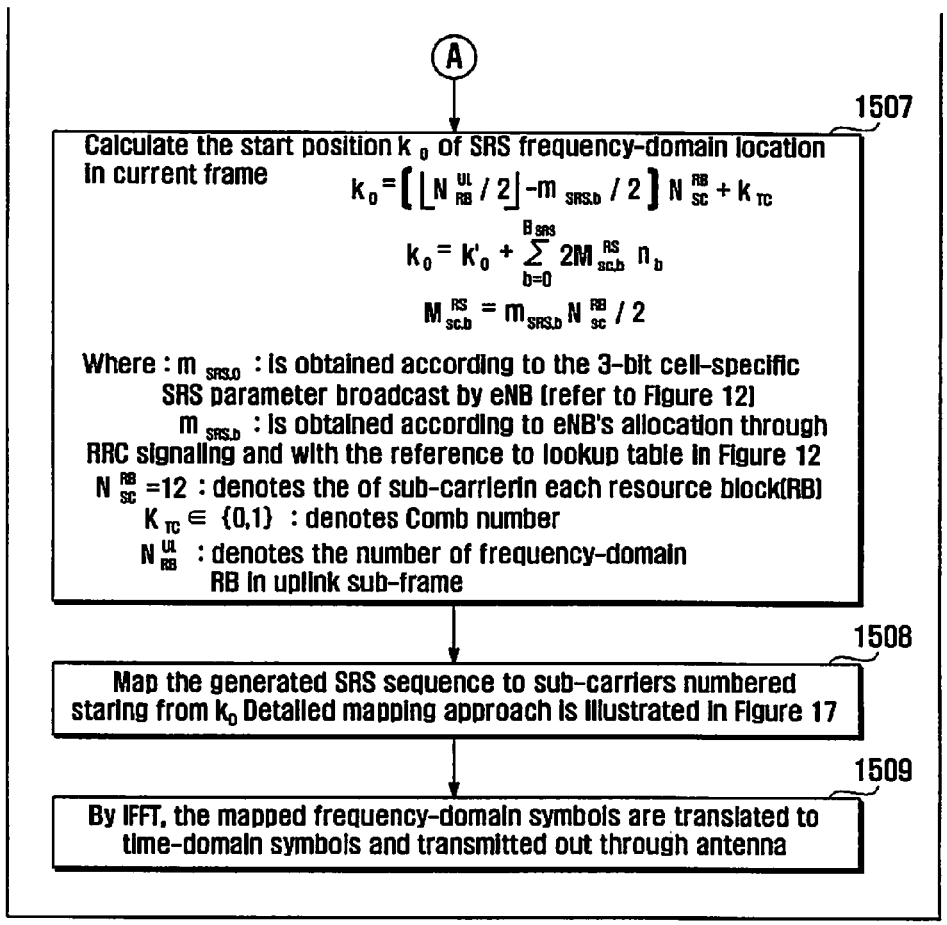
Figure 16A:
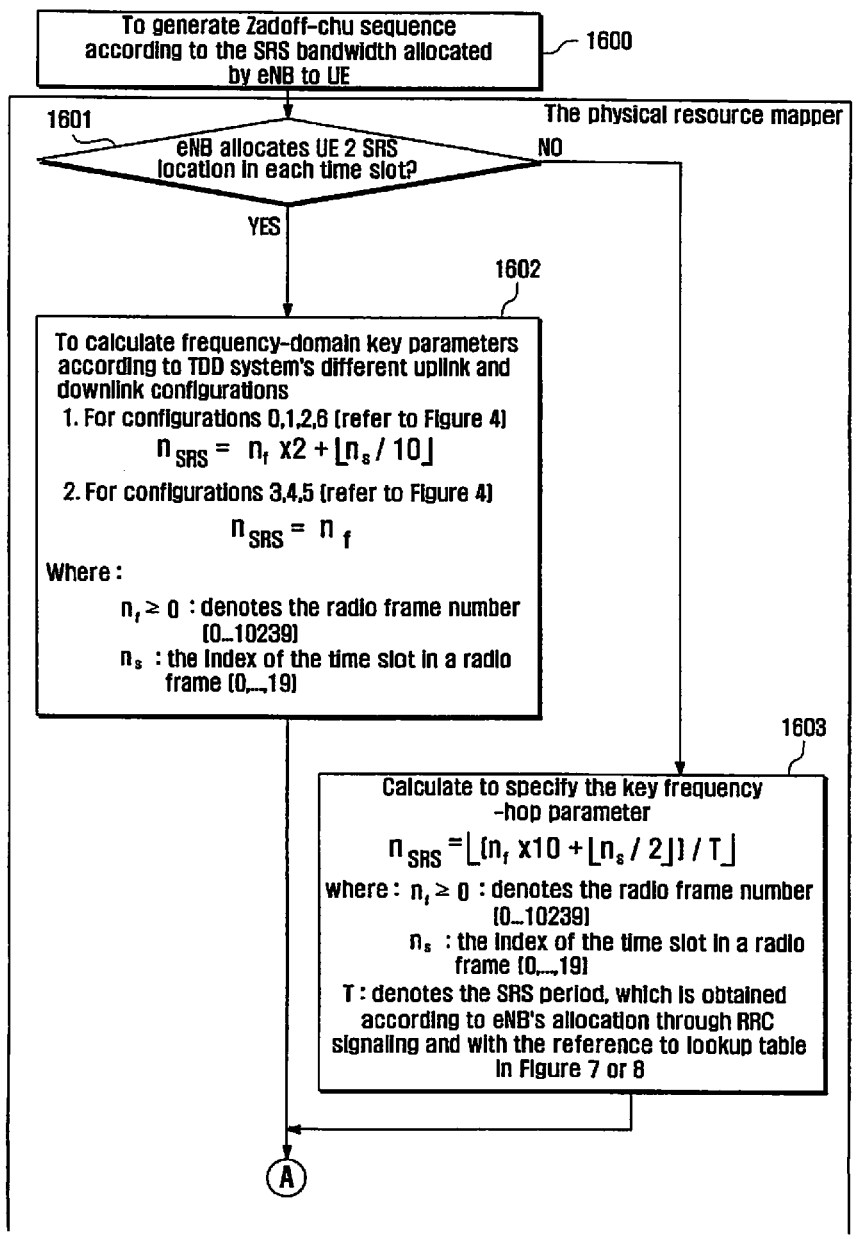
FIGS. 16A through 16D illustrate a frequency-hop method when using an RRC incremental indication.
Figure 16B:
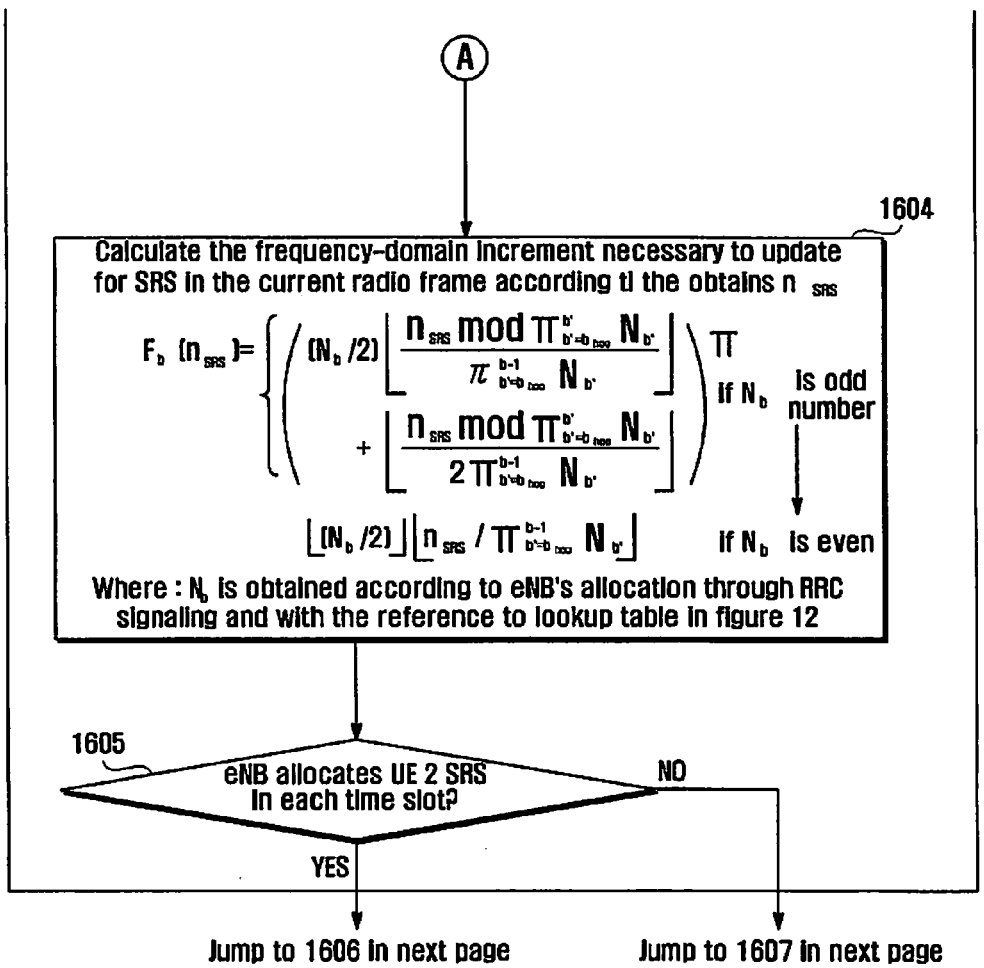
Figure 16C:
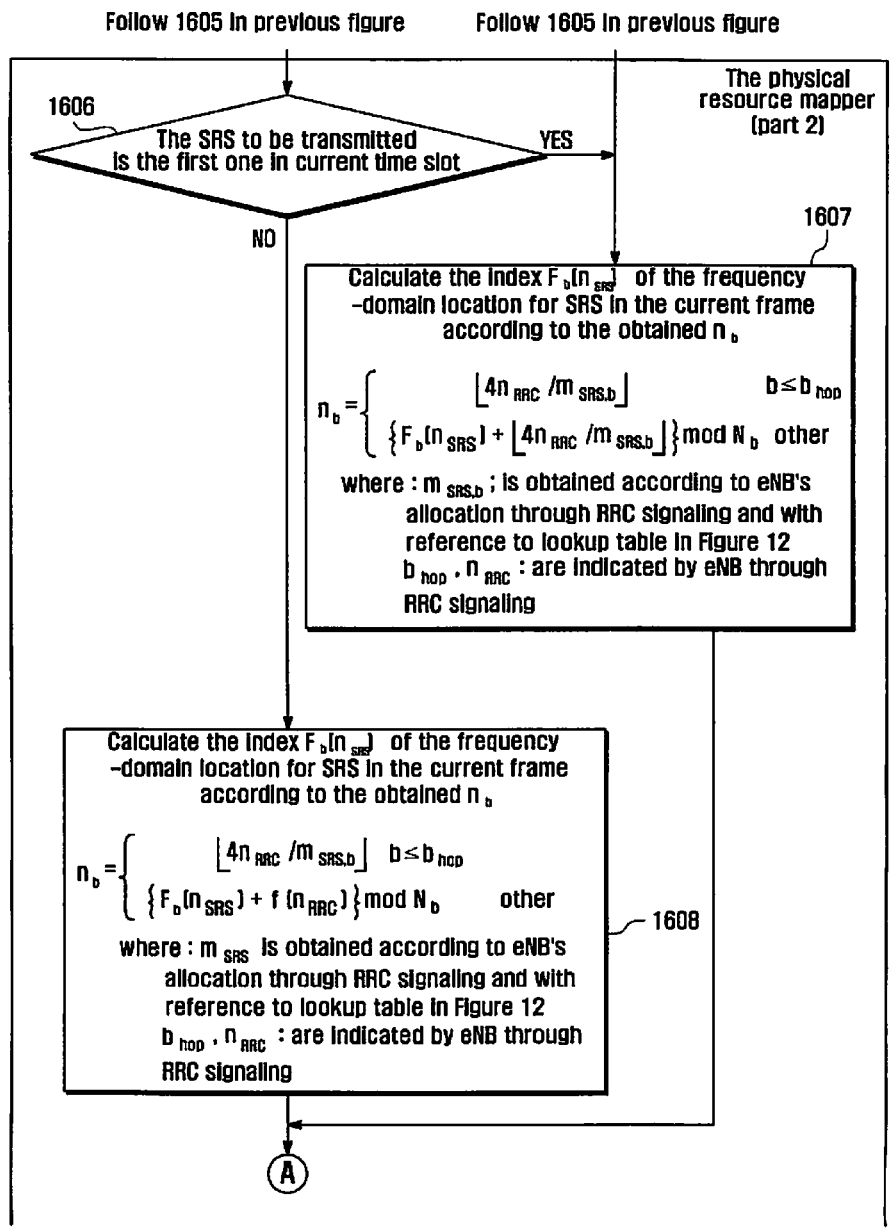
Figure 16D:
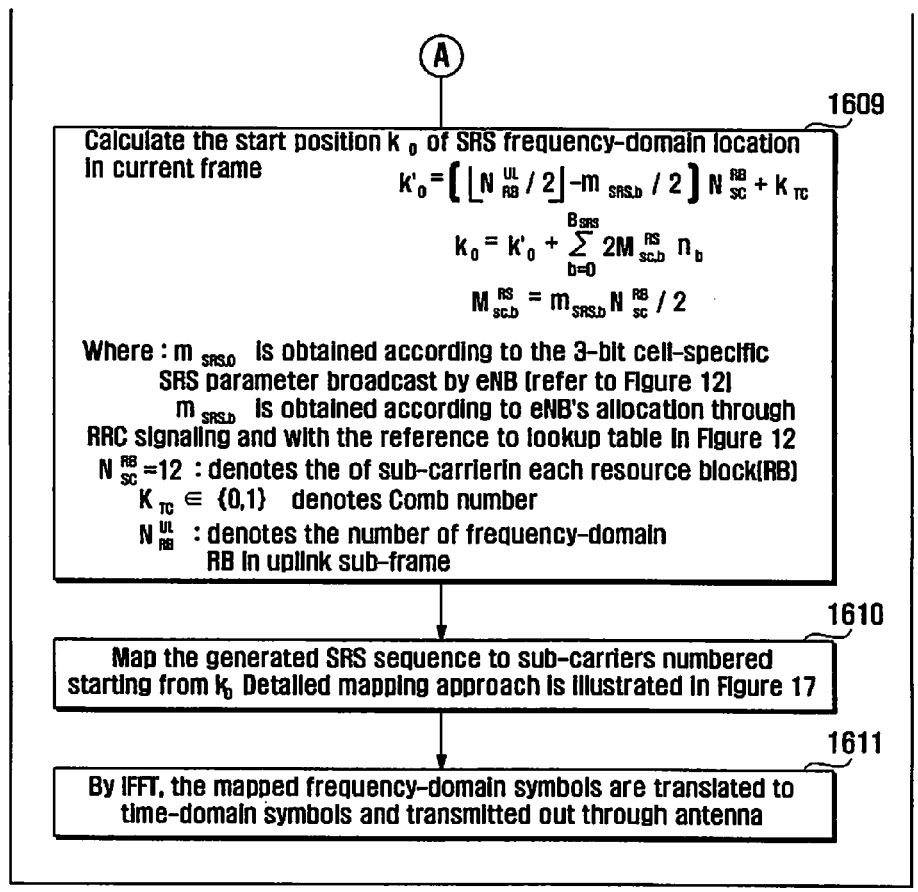

FIGS. 15A through 15C illustrate another SRS frequency-hop method of the present invention, which is suitable for the UE SRS configuration table for the TDD system in FIG. 8. In the method, in step 1500 the UE generates the SRS reference symbol sequence according to the SRS bandwidth parameter (allocated by the eNB through RRC signaling) and the cyclic shift parameter.

In step 1501 the UE determines whether the SRS period (allocated by eNB for UE) is 5, i.e., the UE reads out the value of $I_{SRS}$ (the SRS period, which is transmitted from the eNB through RRC signaling). If $0 \leq I_{SRS} \leq 14$, the method proceeds to step 1502; otherwise, the method proceeds to step 1504.

Figure 18:
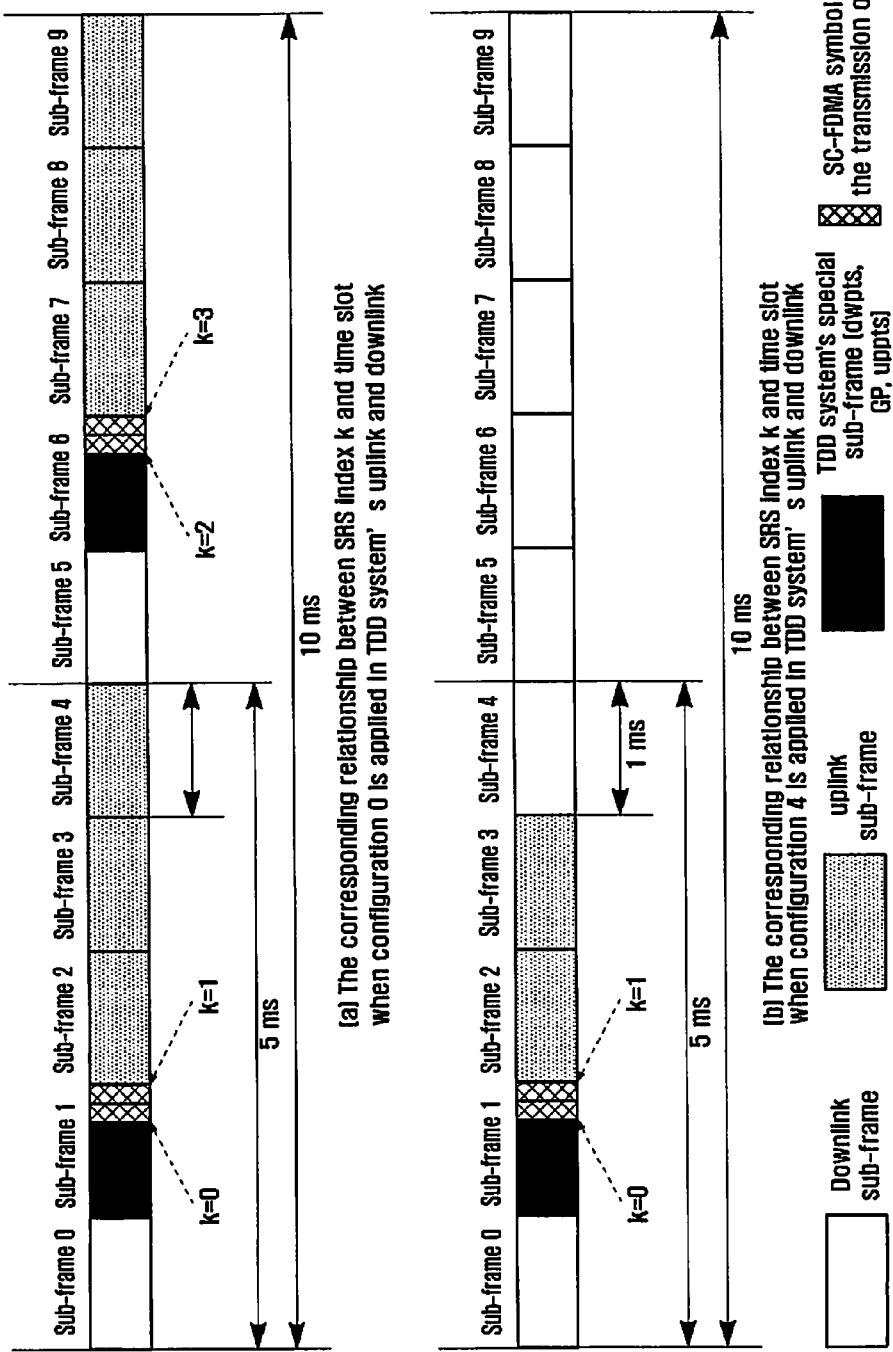
FIG. 18 illustrates a mapping relationship between SRS index k when different uplink and downlink configurations are applied in a TDD system.

In step 1502 the UE reads out the parameter $I_{SRS}$ on SRS period that is transmitted from the eNB through RRC signaling. If $0 \leq I_{SRS} \leq 9$, the method proceeds to step 1503; otherwise, the method proceeds to step 1504;

In step 1503 the UE determines the frequency-hop pattern parameter $n_{SRS}$ according to the index number $n_f$ of the radio frame for transmitting the SRS signal, the index number $n_s$ of the time slot in the radio frame for transmitting the SRS, and the index number k of the SRS in the SRS sequence within the radio frame (refer to FIG. 18). The requirements for determining the parameter are to avoid a collision between SRSs from different UEs but with the same SRS period, the same sub-frame offset and the same Comb index number, and to guarantee that $n_{SRS}$ is continuous with the index number k of the SRS in the SRS sequence within the radio frame and the different uplink and downlink sub-frame configurations in a TDD system so that the UE can sound the entire SRS frequency-hop bandwidth allocated by the eNB.

By these requirements, it can be concluded that $n_{SRS}=f(n_f, k)$. Here, the implementation mode cannot be confined within the mapping method of Equation (7) as follows:

$$n_{SRS} = \lfloor (n_f \times 10 + \lfloor n_s/2 \rfloor)/T \rfloor + \Delta_k \quad (7)$$

(a) For the TDD uplink and downlink configurations 0, 1, 2 and 6:

$$\Delta_k = \begin{cases} 2 \times n_f + k & (k=0,1) \\ 2 \times n_f + k - 1 & (k=2,3) \end{cases}$$

(b) For the TDD uplink and downlink configurations 3, 4 and 5

$$\Delta_k = k (k=0,1)$$

Where k=0, 1, 2 and 3 (if the configurations for the uplink and downlink in TDD system are 0, 1, 2 and 6), k=0 and 1 (if the configurations for the uplink and downlink in TDD system are 3, 4 and 5), k is indexed in ascending order, i.e., the first SC-FDMA symbol in each radio frame for transmitting the SRS corresponds to k=0, the second SC-FDMA symbol in each radio frame for transmitting the SRS corresponds to k=1, the third SC-FDMA symbol in each radio frame for transmitting the SRS corresponds to k=2, the fourth SC-FDMA symbol in each radio frame for transmitting the SRS corresponds to k=3, and $n_f \geq 0$ denotes the index number of radio frame. Here T=5.

Other methods for deriving continuous $n_{SRS}$ according to different values of k may be used as long as the same requirements are applied.

In step 1504 the UE determines the frequency-hop parameter $n_{SRS}$ according to the index number $n_f$ of the radio frame for transmitting the SRS, and the index number $n_s$ of time slot in the radio frame for transmitting the SRS, in Equation (8) as follows:

$$n_{SRS} = \lfloor (n_f \times 10 + \lfloor n_s/2 \rfloor)/T \rfloor \quad (8)$$

In Equation (8), $n_f \geq 0$ denotes the index number of radio frame, $0 \leq n_s \leq 19$ denotes the index number of the time slot in the radio frame for transmitting the SRS, and according to the RRC signaling from the eNB, the UE determines T and $n_s$ with reference to FIG. 8, $5 \leq T \leq 320$.

In step 1505 the frequency-domain increment that the SRS needs to be updated within the frame is calculated according to the obtained $n_{SRS}$, by Equation (9) as follows:

$$F_b(n_{SRS}) = \quad (9)$$

$$\begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

In Equation (9), $N_b$ is obtained according to the RRC signaling from the eNB and with reference to FIGS. 13A through 13D, $b_{hop}$ denotes SRS frequency-hop bandwidth parameter, $0 \leq b_{hop} \leq 3$, which the UE obtains by reading the RRC signaling from the eNB.

In step 1506 the index number $n_b$ frequency-domain location for transmitting the SRS is calculated according to the obtained $F_b(n_{SRS})$, by Equation (10) as follows:

$$n_b = \begin{cases} \lfloor 4n_{RRC}/m_{SRS,b} \rfloor & b \leq b_{hop} \\ \{F_b(n_{SRS}) + \lfloor 4n_{RRC}/m_{SRS,b} \rfloor\} \bmod N_b & \text{else} \end{cases} \quad (10)$$

In Equation (10), $m_{SRS,b}$, $b_{hop}$, $n_{RRC}$ are the parameters that the UE obtains by reading the RRC signaling from the eNB.

In step 1507 the start frequency-domain position $k_0$ is calculated for transmitting the SRS by Equation (11), as follows:

$$k_0' = (\lfloor N_{RB}^{UL}/2 \rfloor - m_{SRS,0}/2) N_{SC}^{RB} + k_{TC} \quad (11)$$

$$k_0 = k_0' + \sum_{b=0}^{B_{SRS}} 2 M_{sc,b}^{RS} n_b$$

$$M_{sc,b}^{RS} = m_{SRS,b} N_{sc}^{RB}/2$$

In Equation (11), $m_{SRS,0}$ is obtained from the 3-bit cell-specific SRS parameter broadcast by the eNB, $m_{SRS,b}$ is allocated by the eNB through RRC signaling and obtained with reference to the lookup table in FIGS. 13A through 13D, $N_{sc}^{RB}=12$ denotes the number of sub-carrier in each RB, $k_{TC} \in \{0,1\}$ denotes the Comb number, and $N_{RB}^{UL}$ denotes the number of frequency-domain RB in the uplink sub-frame.

In step 1508 the SRS sequence is mapped to sub-carriers numbered beginning with $k_0$. The detailed mapping technique is shown in FIG. 17.

In step 1509 the frequency-domain symbols obtained by using IFFT are mapped to time-domain symbols, and then transmitted through antennas.

In addition, another SRS frequency-hop method according to the present invention is shown in FIGS. 16A through 16D. In the method, in step 1600 the UE generates the SRS reference symbol sequence according to the SRS bandwidth parameter (allocated by the eNB through RRC signaling) and the cyclic shift parameter.

In step 1601 the UE reads out the SRS period index $I_{SRS}$ transmitted from the eNB. If $0 \leq I_{SRS} \leq 9$, the method proceeds to step 1602; otherwise, the method proceeds to step 1603.

In step 1602 the parameter $n_{SRS}$ is calculated according to different configurations in a TDD system. For the TDD uplink and downlink configurations 0, 1, 2 and 6 as shown in FIG. 4, Equation (12) is used as follows:

$$n_{SRS} = n_f \times 2 + \lfloor n_s/10 \rfloor \quad (12)$$

For the TDD uplink and downlink configurations 3, 4 and 5 as shown in FIG. 4, Equation (13) is used a follows:

$$n_{SRS}=n_f \quad (13)$$

In Equations (12) and (13), $n_f$ denotes the index number of radio frame, $n_f \geq 0$; $n_s$ denotes the index number of the time slot in the radio frame for transmitting the SRS, and $0 \leq n_s \leq 19$.

In step 1603 the UE determines the frequency-hop parameter $n_{SRS}$ according to the index number $n_f$ of the radio frame for transmitting the SRS, and the index number $n_s$ of time slot in the radio frame for transmitting the SRS, by Equation (14) as follows:

$$n_{SRS}=\lfloor (n_f \times 10+\lfloor n_s/2 \rfloor)/T \rfloor \quad (14)$$

In Equation (14), $n_f$ denotes the index number of radio frame, $n_f \geq 0$, $n_s$ denotes the index number of the time slot in the radio frame for transmitting the SRS, $0 \leq n_s \leq 19$, and according to the RRC signaling from the eNB, the UE determines T and $n_s$.

In step 1604 the frequency-domain increment that the SRS needs to be updated within the frame is calculated according to the obtained $n_{SRS}$, by Equation (15) as follows:

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad (15)$$

In Equation (15), $N_b$ is obtained according to the RRC signaling from the eNB and with reference to FIGS. 13A through 13D, $b_{hop}$ denotes the SRS frequency-hop bandwidth parameter, which the UE obtains by reading the RRC signaling from the eNB, and $0 \leq b_{hop} \leq 3$.

In step 1605 the UE reads out the SRS period index $I_{SRS}$ transmitted from eNB. If $0 \leq I_{SRS} \leq 9$, the method proceeds to step 1606; otherwise, the method proceeds to step 1607.

In step 1606 the UE determines whether the SRS to be transmitted is the first one in a current time slot. If yes, the method proceeds to step 1607; otherwise, the method proceeds to step 1608.

In step 1607 the index number $n_b$ frequency-domain location for transmitting the SRS is calculated according to the obtained $F_b(n_{SRS})$, by Equation (16) as follows:

$$n_b = \begin{cases} \lfloor 4n_{RRC}/m_{SRS,b} \rfloor & b \leq b_{hop} \\ \{F_b(n_{SRS}) + \lfloor 4n_{RRC}/m_{SRS,b} \rfloor\} \bmod N_b & \text{else} \end{cases} \quad (16)$$

In Equation (16), $m_{SRS}$, $b_{hop}$, $n_{RRC}$ are the parameters that the UE obtains by reading the RRC signaling from the eNB.

In step 1608 the index number $n_b$ frequency-domain location for transmitting the SRS is calculated according to the obtained $F_b(n_{SRS})$, by Equation (17) as follows:

$$n_b = \begin{cases} \lfloor 4n_{RRC}/m_{SRS,b} \rfloor & b \leq b_{hop} \\ \{F_b(n_{SRS}) + f(n_{RRC})\} \bmod N_b & \text{else} \end{cases} \quad (17)$$

In Equation (17), $m_{SRS,b}$, $b_{hop}$, $n_{RRC}$ are the parameters that the UE obtains by reading the RRC signaling from the eNB.

Different variations to the foregoing method can be applied. For example, in Equation (18), $$n_b = \begin{cases} \lfloor 4n_{RRC}/m_{SRS,b} \rfloor & b \leq b_{hop} \\ \{F_b(n_{SRS}) + \lfloor 4n_{RRC}/m_{SRS,b} \rfloor + \Delta_b\} \bmod N_b & \text{else} \end{cases} \quad (18)$$

Where: $\Delta_b=0, 1, 2, \ldots N_b-1$.

The approach in Equation (19) can also be adopted to calculate $n_b$, as follows:

$$n_b = \begin{cases} \lfloor 4n_{RRC}/m_{SRS,b} \rfloor & b \leq b_{hop} \\ \{F_b(n_{SRS}) + \lfloor 4(n_{RRC}+\Delta)/m_{SRS,b} \rfloor\} \bmod N_b & \text{else} \end{cases} \quad (19)$$

Where: $\Delta \geq 0$.

In step 1609 the start frequency-domain position $k_0$ for transmitting the SRS is calculated by Equation (20), as follows:

$$k_0' = (\lfloor N_{RB}^{UL}/2 \rfloor - m_{SRS,0}/2)N_{SC}^{RB} + k_{TC} \quad (20)$$

$$k_0 = k_0' + \sum_{b=0}^{B_{SRS}} 2M_{sc,b}^{RS} n_b$$

$$M_{sc,b}^{RS} = m_{SRS,b} N_{sc}^{RB}/2$$

In Equation (20), $m_{SRS,0}$ is obtained from the 3-bit cell-specific SRS parameter broadcast by the eNB, $m_{SRS,b}$ is allocated by the eNB through RRC signaling and obtained with reference to the lookup table in FIGS. 13A through 13D, $N_{sc}^{RB}=12$ denotes the number of sub-carrier in each RB, $k_{TC} \in \{0,1\}$ denotes the Comb number, and $N_{RB}^{UL}$ denotes the number of the frequency-domain RB in the uplink sub-frame.

In step 1610 the SRS sequence is mapped to sub-carriers numbered starting from $k_0$. The detailed mapping technique is shown in FIG. 17.

In step 1611 the frequency-domain symbols obtained by IFFT are mapped to time-domain symbols and are then transmitted through antennas.

In the following embodiment of the present invention, it is assumed that the uplink of the TDD system occupies N RBs, where N=25.

The index number of the SRS bandwidth configuration broadcast by the eNB is k, where k=3.

The SRS period parameter configured by the eNB for the UE through the RRC signaling is $I_{SRS}$, where $I_{SRS}=0$ in this example.

The SRS bandwidth parameter configured by the eNB for the UE through the RRC signaling is $M_{SRS,b}$, and the frequency-hop bandwidth is $b_{hop}$, the index of number of Comb for transmitting the SRS is $k_{TC}$, where b=3, and $m_{SRS,b}=4$, $b_{hop}=0$, $k_{TC}=0$.

The start frequency-hop position configured by the eNB for the UE through the RRC signaling is $\lfloor 4n_{RRC}/m_{SRS,b} \rfloor$, where $n_{RRC}=0$.

In a TDD system, the uplink and downlink are configured with the configuration l, where l=1 in the examples 1, 2 and 3, and l=4 in the examples 4, 5 and 6.

Figure 14B:
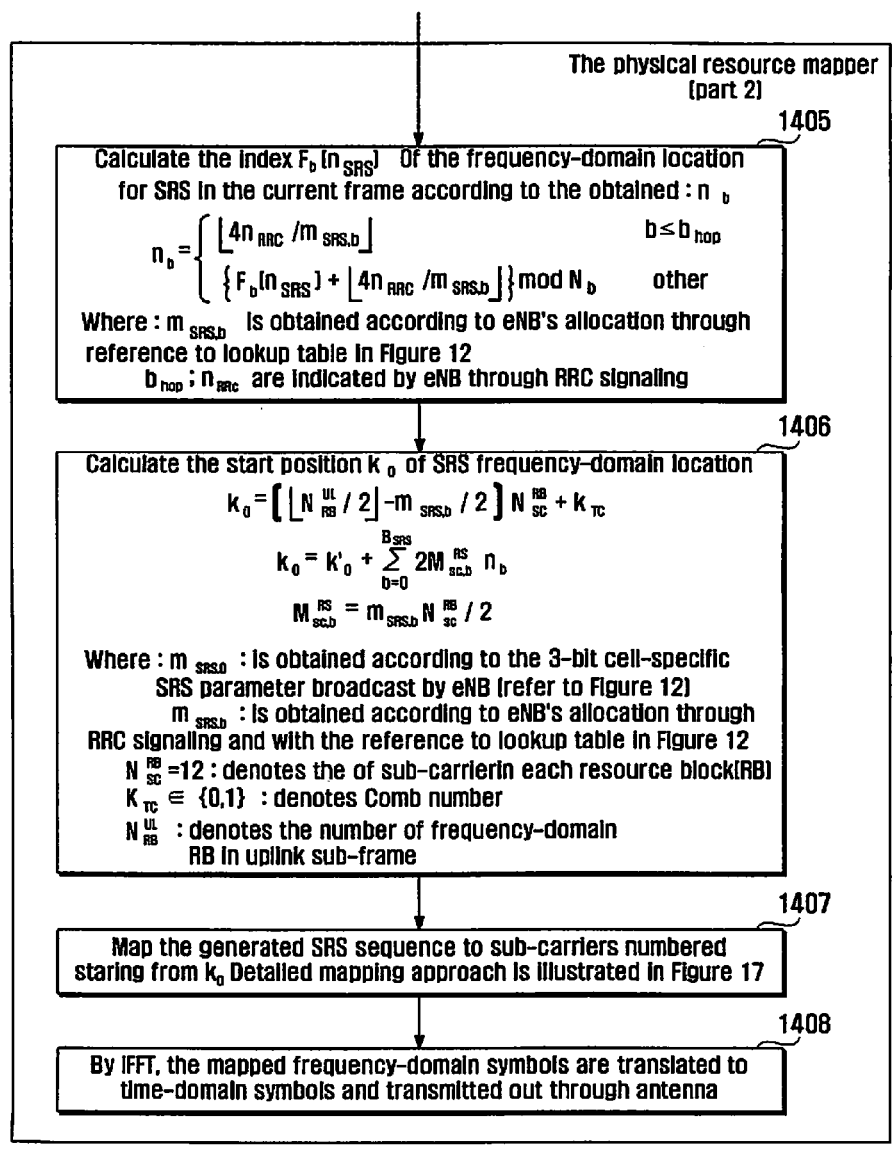

A first embodiment is suitable for the TDD system for which FIG. 7 illustrates the UE SRS configuration table. The processing flow is illustrated in FIGS. 14A and 14B.

In step 1, the UE generates the Zadeoff-chu sequence with the length of $H=m_{SRS,b}\times 12/2=4\times 12/2=24$ according to the SRS bandwidth parameter $m_{SRS,b}=4$ configured by the eNB through RRC signaling.

In step 2, the UE deduces the SRS period T=2 according to the SRS period index $I_{SRS}=0$ and with the information in FIG. 7. Moreover, the UE learns about in each radio frame the SRS index k=0, 1, 2 and 3 and the corresponding time slot index, as shown in FIG. 18(a);

In step 3, before transmitting the SRS signal each time, the UE calculates the key frequency-hop parameter $n_{SRS}$ according to current SRS index k and the radio frame index $n_f$. In this embodiment, it is assumed that current frame's index number $n_f=0$, and for the second transmission of SRS, k=1, L=4, and $n_{SRS}=n_f\times 4+k=0\times 4+1=1$.

In subsequent steps, the frequency-domain increment is calculated by Equation (21) as follows:

$$F_3(1)=\lfloor 5/2\rfloor \lfloor 1/\Pi_{b'=0}^2 N_{b'}\rfloor=2 \qquad (21)$$

The frequency-domain location for transmitting the SRS is calculated according to Equation (22) as follows:

$$F_3(1) \text{ as } n_3=\{F_3(1)+0\} \bmod 5=2 \qquad (22)$$

The frequency-domain sub-carrier's start position for transmitting the SRS is calculated by Equation (23) as $$k'_0 = (\lfloor N_{RB}^{UL}/2\rfloor - m_{SRS,0}/2)\times N_{SC}^{RB} + k_{TC} \qquad (23)$$
$$= (\lfloor 25/2\rfloor - 20/2)\times 12 + 0 = 24;$$
$$k_0 = k'_0 + \sum_{b=0}^{3} 2\times m_{SRS,b}\times n_b$$
$$= 24 + (20\times 12\times 0 + 4\times 12\times 2) = 120;$$

The UE maps the generated SRS symbols to the sub-carriers numbered starting from $k_0$, as shown in FIG. 17, and then adopts IFFT to translate the frequency-domain symbols to time-domain symbols and transmit the symbols through an antenna.

A second embodiment is suitable for the TDD system for which FIG. 8 shows the UE SRS configuration table.

The processing flow is illustrated in FIGS. 15A through 15C:

In step 1, the UE generates the Zadeoff-chu sequence with the length of $H=m_{SRS,b}\times 12/2=4\times 12/2=24$ according to the SRS bandwidth parameter $m_{SRS,b}=4$ configured by eNB through RRC signaling.

In step 2, the UE deduces the SRS period T=5 according to the SRS period index $I_{SRS}=0$ and with the information in FIG. 8. Moreover, the UE learns about in each radio frame the SRS index k=0, 1, 2 and 3 and the corresponding time slot index, as shown in FIG. 18(a).

In step 3, before transmitting the SRS signal each time, the UE calculates the key frequency-hop parameter $n_{SRS}$ according to the current SRS index k and the radio frame index $n_f$. In this embodiment, it is assumed that the current frame's index number $n_f=0$, and for the third transmission of the SRS, k=2. Thus, $n_{SRS}=\lfloor(n_f\times 10+\lfloor n_s/2\rfloor)/T\rfloor+2\times n_f+k=\lfloor(0\times 10+\lfloor 3/2\rfloor)/5\rfloor+2\times 0+2=2$.

In subsequent steps, the frequency-domain increment is calculated by Equation (24) as follows:

$$F_3(1)=\lfloor 5/2\rfloor \lfloor 2/\Pi_{b'=0}^2 N_{b'}\rfloor=4 \qquad (24)$$

The frequency-domain location for transmitting the SRS is calculated according to Equation (25) as follows:

$$F_3(1) \text{ as } n_3=\{F_3(1)+0\} \bmod 5=4 \qquad (25)$$

The frequency-domain sub-carrier's start position for transmitting the SRS is calculated by Equation (26) as follows:

$$k'_0 = (\lfloor N_{RB}^{UL}/2\rfloor - m_{SRS,0}/2)\times N_{SC}^{RB} + k_{TC} \qquad (26)$$
$$= (\lfloor 25/2\rfloor - 20/2)\times 12 + 0 = 24;$$
$$k_0 = k'_0 + \sum_{b=0}^{3} 2\times m_{SRS,b}\times n_b$$
$$= 24 + (20\times 12\times 0 + 4\times 12\times 4) = 192;$$

The UE maps the generated SRS symbols to the sub-carriers numbered starting from $k_0=192$, as shown in FIG. 17, and then adopts IFFT to translate the frequency-domain symbols to time-domain symbols and transmit the signals through an antenna.

A third embodiment corresponds to the RRC indicated frequency-hop method illustrated in FIGS. 16A through 16D. In step 1, the UE generates the Zadeoff-chu sequence with the length of $H=m_{SRS,b}\times 12/2=4\times 12/2=24$ according to the SRS bandwidth parameter $M_{SRS,b}=4$ configured by the eNB through RRC signaling.

In step 2, the UE deduces the index number $n_s$ of the time slot where the SC-FDMA symbol for transmitting the SRS locates in each radio frame according to the SRS period index $I_{SRS}=0$. The UE calculates the key frequency-hop parameter $n_{SRS}$ according to the radio frame index $n_f$ and the obtained time slot index $n_s$. In this embodiment, it is assumed that current frame's index number $n_f=0$, and for the second transmission of the SRS, $n_{SRS}=2\times n_f+\lfloor n_s/10\rfloor=\lfloor(0\times 2+\lfloor 3/10\rfloor)\rfloor=0$.

In subsequent steps, the frequency-domain increment is calculated by Equation (27) as follows:

$$F_3(1)=\lfloor 5/2\rfloor \lfloor 0/\Pi_{b'=0}^2 N_{b'}\rfloor=0. \qquad (27)$$

It is assumed that $f(n_{RRC})=\lfloor 4n_{RRC}/m_{SRS,3}\rfloor+2=2$ in this embodiment. The frequency-domain location for transmitting the SRS is calculated according to Equation (28) as follows:

$$F_3(1) \text{ as } n_3=\{F_3(1)+0+2\} \bmod 5=2; \qquad (28)$$

The frequency-domain sub-carrier's start position for transmitting the SRS is calculated by Equation (29) as $$k'_0 = (\lfloor N_{RB}^{UL}/2\rfloor - m_{SRS,0}/2)\times N_{SC}^{RB} + k_{TC} \qquad (29)$$
$$= (\lfloor 25/2\rfloor - 20/2)\times 12 + 0 = 24$$
$$k_0 = k'_0 + \sum_{b=0}^{3} 2\times m_{SRS,b}\times n_b$$
$$= 24 + (20\times 12\times 0 + 4\times 12\times 2) = 120$$

The UE maps the generated SRS symbols to the sub-carriers numbered starting from $k_0=120$, as shown in FIG. 17, and then adopts IFFT to translate the frequency-domain symbols to time-domain symbols and transmit the symbols through an antenna.

A fourth embodiment is suitable for the TDD system for which FIG. 7 shows the UE SRS configuration table.

The processing flow is illustrated in FIGS. 14A and 14B.

In step 1, the UE generates the Zadeoff-chu sequence with the length of $H=m_{SRS,b} \times 12/2=4 \times 12/2=24$ according to the SRS bandwidth parameter $m_{SRS,b}=4$ configured by the eNB through RRC signaling.

In step 2, the UE deduces the SRS period T=2 according to the SRS period index $I_{SRS}=0$ and with the information in FIG. 7. Moreover, the UE learns about in each radio frame the SRS index k=0, 1 and the corresponding time slot index, as shown in FIG. 18(*b*).

In step 3, before transmitting the SRS signal each time, the UE calculates the key frequency-hop parameter $n_{SRS}$ according to a current SRS index k and the radio frame index $n_f$. In this embodiment, it is assumed that the current frame's index number $n_f=1$, and for the second transmission of the SRS, k=1, and L=2. Thus $n_{SRS}=n_f \times 2+k=1 \times 2+1=3$.

In subsequent steps, the frequency-domain increment is calculated by Equation (30) as follows:

$$F_3(1)=\lfloor 5/2 \rfloor \lfloor 3/\Pi_{b'=0}^2 N_{b'} \rfloor = 6 \tag{30}$$

The frequency-domain location for transmitting the SRS is calculated by Equation (31) according to $F_3(1)$ as $$n_3=\{F_3(1)+0\} \bmod 5 = 1. \tag{31}$$

The frequency-domain sub-carrier's start position for transmitting the SRS is calculated by Equation (32) as $$k'_0 = (\lfloor N_{RB}^{UL}/2 \rfloor - m_{SRS,0}/2) \times N_{SC}^{RB} + k_{TC} \tag{32}$$
$$= (\lfloor 25/2 \rfloor - 20/2) \times 12 + 0$$
$$= 24$$

$$k_0 = k'_0 + \sum_{b=0}^{3} 2 \times m_{SRS,b} \times n_b$$
$$= 24 + (20 \times 12 \times 0 + 4 \times 12 \times 1)$$
$$= 72$$

The UE maps the generated SRS symbols to the sub-carriers numbered starting from $k_0$, as shown in FIG. 17, and then adopts IFFT to translate the frequency-domain symbols to time-domain symbols and transmit the symbols through an antenna.

A fifth embodiment is suitable for the TDD system for which FIG. 8 shows the UE SRS configuration table. The processing flow is illustrated in FIGS. 15A through 15C:

In step 1, the UE generates the Zadeoff-chu sequence with the length of $H=m_{SRS,b} \times 12/2=4 \times 12/2=24$ according to the SRS bandwidth parameter $m_{SRS,b}=4$ configured by the eNB through RRC signaling.

In step 2, the UE deduces the SRS period T=5 according to the SRS period index $I_{SRS}=0$ and with the information in FIG. 8. Moreover, the UE learns about in each radio frame the SRS index k=0 and 1 and the corresponding time slot index, as shown in FIG. 18(*b*).

In step 3, before transmitting the SRS signal each time, the UE calculates the key frequency-hop parameter $n_{SRS}$ according to a current SRS index k and the radio frame index $n_f$. In this embodiment, it is assumed that current frame's index number $n_f=2$, and for the 0$^{th}$ transmission of SRS, $n_{SRS}=\lfloor (n_f \times 10+\lfloor n_s/2 \rfloor)/T \rfloor + 2 \times n_f+k=\lfloor (2 \times 10+\lfloor 3/2 \rfloor)/5 \rfloor+2 \times 2+0=8$.

In subsequent steps, the frequency-domain increment is calculated by Equation (33) as follows:

$$F_3(1)=\lfloor 5/2 \rfloor \lfloor 8/\Pi_{b'=0}^2 N_{b'} \rfloor = 16 \tag{33}$$

The frequency-domain location for transmitting the SRS is calculated according to Equation (34) as follows:

$$F_3(1) \text{ as } n_3 = \{F_3(1)+0\} \bmod 5 = 1. \tag{34}$$

The frequency-domain sub-carrier's start position for transmitting the SRS is calculated by Equation (35) as follows:

$$k'_0 = (\lfloor N_{RB}^{UL}/2 \rfloor - m_{SRS,0}/2) \times N_{SC}^{RB} + k_{TC} \tag{35}$$
$$= (\lfloor 25/2 \rfloor - 20/2) \times 12 + 0$$
$$= 24;$$

$$k_0 = k'_0 + \sum_{b=0}^{3} 2 \times m_{SRS,b} \times n_b$$
$$= 24 + (20 \times 12 \times 0 + 4 \times 12 \times 1)$$
$$= 72;$$

The UE maps the generated SRS symbols to the sub-carriers numbered starting from $k_0=72$, as shown in FIG. 17, and then adopts IFFT to translate the frequency-domain symbols to time-domain symbols and transmit the symbols through an antenna.

A sixth embodiment corresponds to the RRC indicated frequency-hop method illustrated in FIGS. 16A through 16D. In step 1, the UE generates the Zadeoff-chu sequence with the length of $H=M_{SRS,b} \times 12/2=4 \times 12/2=24$ according to the SRS bandwidth parameter $m_{SRS,b}=4$ configured by the eNB through RRC signaling.

In step 2, the UE deduces the index number $n_s$ of the time slot where the SC-FDMA symbol for transmitting the SRS locates in each radio frame according to SRS period index $I_{SRS}=0$. The UE calculates the key frequency-hop parameter $n_{SRS}$ according to the radio frame index $n_f$ and the obtained time slot index $n_s$. In this embodiment, it is assumed that current frame's index number $n_f=8$, and for the second transmission of the SRS, $n_{SRS}=n_f=8$.

In subsequent steps, the frequency-domain increment is calculated by Equation (36) as follows:

$$F_3(1)=\lfloor 5/2 \rfloor \lfloor 8/\Pi_{b'=0}^2 N_{b'} \rfloor = 16 \tag{36}$$

It is assumed that $f(n_{RRC})=\lfloor 4 n_{RRC}/m_{SRS,3} \rfloor +2=2$ in this embodiment. The frequency-domain location for transmitting the SRS is calculated according to $F_3(1)$ as by Equation (37):

$$n_3=\{F_3(1)+0+2\} \bmod 5 = 3 \tag{37}$$

The frequency-domain sub-carrier's start position for transmitting the SRS is calculated by Equation (38) as follows:

$$k'_0 = (\lfloor N_{RB}^{UL}/2 \rfloor - m_{SRS,0}/2) \times N_{SC}^{RB} + k_{TC} \tag{38}$$
$$= (\lfloor 25/2 \rfloor - 20/2) \times 12 + 0$$
$$= 24;$$

-continued $$k_0 = k'_0 + \sum_{b=0}^{3} 2 \times m_{SRS,b} \times n_b$$
$$= 24 + (20 \times 12 \times 0 + 4 \times 12 \times 3)$$
$$= 168;$$

The UE maps the generated SRS symbols to the sub-carriers numbered starting from $k_0=168$, as shown in FIG. 17, and then adopts IFFT to translate the frequency-domain symbols to time-domain symbols and transmit the symbols through an antenna.

What is claimed is:

1. A method for transmitting an uplink Sounding Reference Signal (SRS), the method comprising steps of:
   a) identifying a number of downlink and uplink switch points within a radio frame, $N_{sp}$, and a system frame number $n_f$;
   b) calculating a value of $n_{SRS}$ according to the number of downlink and uplink switch points within a radio frame $N_{sp}$, and the system frame number $n_f$ for transmitting the SRS;
   c) determining a frequency-domain starting position of the SRS based on $n_{SRS}$; and
   d) transmitting the SRS at the determined frequency-domain starting position.

2. The method of claim 1, wherein $n_{SRS}$ is calculated by $n_{SRS}=n_f \times L + k$, for 2 ms SRS periodicity in a TDD system,
   where $n_f$ is the system frame number, L is $2^*N_{sp}$ being the number of downlink and uplink switch points within a radio frame, and k can be 0, 1, 2 or 3.

3. The method of claim 1, further comprising, after step a) and before step b):
   calculating a frequency-domain increment to be updated for the SRS according to the obtained $n_{SRS}$; and
   calculating a frequency position index for transmitting the SRS according to the obtained frequency-domain increment.

4. The method of claim 3, wherein the frequency-domain increment is calculated by:

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} + \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd,} \end{cases}$$

where $N_b$ is obtained according to a Radio Resource Control (RRC) signaling and $b_{hop}$ denotes SRS frequency-hopping parameter, $0 \leq b_{hop} \leq 3$, which is provided by a higher-layer parameter.

5. The method of claim 4, wherein the frequency position index is calculated by:

$$n_b = \begin{cases} \lfloor 4n_{RRC}/m_{SRS,b} \rfloor & b \leq b_{hop} \\ \{F_b(n_{SRS}) + \lfloor 4n_{RRC}/m_{SRS,b} \rfloor\} \bmod N_b & \text{else,} \end{cases}$$

where $m_{SRS,b}$ is obtained by reading the RRC signaling and $n_{RRC}$ is given by a higher-layer parameter.

6. The method of claim 5, wherein the frequency-domain starting position $k_0$ is calculated by:

$$k_0 = k'_0 + \sum_{b=0}^{B_{SRS}} 2 M_{sc,b}^{RS} n_b$$
$$k'_0 = (\lfloor N_{RB}^{UL}/2 \rfloor - m_{SRS,0}/2) N_{sc}^{RB} + k_{TC}$$
$$M_{sc,b}^{RS} = m_{SRS,b} N_{sc}^{RB}/2,$$

where $m_{SRS,0}$ obtained from a cell-specific SRS parameter, $N_{sc}^{RB}$ denotes resource block size in the frequency domain, expressed as a number of subcarriers, $k_{TC} \in \{0, 1\}$ denotes a Comb parameter, and $N_{RB}^{UL}$ denotes uplink bandwidth configuration, expressed in multiples of $N_{sc}^{RB}$.

7. The method of claim 2, wherein the identifying step further comprises:
   indexing a first SC-FDMA symbol for transmitting the SRS in a radio frame as k=0;
   indexing a second SC-FDMA symbol for transmitting the SRS in a radio frame as k=1;
   indexing a third SC-FDMA symbol for transmitting the SRS in a radio frame as k=2; and
   indexing a fourth SC-FDMA symbol for transmitting the SRS in a radio frame as k=3.

8. A User Equipment (UE) for transmitting an uplink Sounding Reference Signal (SRS) comprising:
   an SRS sequence generator for generating an SRS sequence;
   a physical resource mapper for transmitting the SRS; and
   a transmitter for transmitting the SRS at a determined frequency-domain starting position,
   wherein the physical resource mapper is adapted to perform the following sequence of steps:
   a) identifying a number of downlink and uplink switch points within a radio frame, $N_{sp}$, and a system frame number $n_f$;
   b) calculating a value of $n_{SRS}$ according to the number of downlink and uplink switch points within a radio frame $N_{sp}$, and the system frame number $n_f$ for transmitting the SRS; and
   c) determining a frequency-domain starting position of the SRS based on $n_{SRS}$.

9. The UE of claim 8, wherein $n_{SRS}$ is calculated by $n_{SRS}=n_f \times L + k$, for 2 ms SRS periodicity in a TDD system,
   where $n_f$ is the system frame number, L is $2^*N_{sp}$ being the number of downlink and uplink switch points within a radio frame, and k can be 0, 1, 2 or 3.

10. The UE of claim 8, wherein the physical resource mapper performs further steps of:
   calculating a frequency-domain increment to be updated for the SRS according to the obtained $n_{SRS}$; and
   calculating a frequency position index for transmitting the SRS according to the obtained frequency-domain increment.

11. The UE of claim 10, wherein the frequency-domain increment is calculated by:

$$F_b(n_{SRS}) = \begin{cases} (N_b/2)\left[\dfrac{n_{SRS} \bmod \prod_{b'=b_{hop}}^{b} N_{b'}}{\prod_{b'=b_{hop}}^{b-1} N_{b'}} + \dfrac{n_{SRS} \bmod \prod_{b'=b_{hop}}^{b} N_{b'}}{2\prod_{b'=b_{hop}}^{b-1} N_{b'}}\right] & \text{if } N_b \text{ even} \\ \lfloor N_b/2 \rfloor \left\lfloor n_{SRS} \Big/ \prod_{b'=b_{hop}}^{b-1} N_{b'} \right\rfloor & \text{if } N_b \text{ odd,} \end{cases}$$

where $N_b$ is obtained according to an RRC(Radio Resource Control) signaling and $b_{hop}$ denotes SRS frequency-hopping parameter, $0 \leq b_{hop} \leq 3$, which is provided by a higher-layer parameter.

12. The UE of claim 11, wherein the frequency position index is calculated by:

$$n_b = \begin{cases} \lfloor 4n_{RRC}/m_{SRS,b} \rfloor & b \leq b_{hop} \\ \{F_b(n_{SRS}) + \lfloor 4n_{RRC}/m_{SRS,b} \rfloor\} \bmod N_b & \text{else,} \end{cases}$$

where $M_{SRS,b}$ is obtained by reading the RRC signaling and $n_{RRC}$ is given by a higher-layer parameter.

13. The UE of claim 12, wherein, the frequency-domain starting position $k_0$ is calculated by:

$$k_0 = k_0' + \sum_{b=0}^{B_{SRS}} 2M_{sc,b}^{RS} n_b$$

$$k_0' = (\lfloor N_{RB}^{UL}/2 \rfloor - m_{SRS,0}/2)N_{SC}^{RB} + k_{TC}$$

$$M_{sc,b}^{RS} = m_{SRS,b} N_{sc}^{RB}/2,$$

where $m_{SRS,0}$ obtained from a cell-specific SRS parameter, $N_{sc}^{RB}$ denotes resource block size in the frequency domain, expressed as a number of subcarriers, $k_{TC} \in \{0, 1\}$ denotes a Comb parameter, and $N_{RB}^{UL}$ denotes uplink bandwidth configuration, expressed in multiples of $N_{sc}^{RB}$.

14. The UE of claim 9, wherein the physical resource mapper further performs:
  indexing a first SC-FDMA symbol for transmitting the SRS in a radio frame as k=0,
  indexing a second SC-FDMA symbol for transmitting the SRS in a radio frame as k=1,
  indexing a third SC-FDMA symbol for transmitting the SRS in a radio frame as k=2, and
  indexing a fourth SC-FDMA symbol for transmitting the SRS in a radio frame as k=3.

15. A method for receiving an uplink Sounding Reference Signal (SRS), the method comprising steps of:
  a) identifying a number of downlink and uplink switch points within a radio frame, $N_{sp}$, and a system frame number $n_f$;
  b) calculating a value of $n_{SRS}$ according to the number of downlink and uplink switch points within a radio frame $N_{sp}$, and the system frame number $n_f$ for transmitting the SRS;
  c) determining a frequency-domain starting position of the SRS based on $n_{SRS}$; and
  d) receiving the SRS at the determined frequency-domain starting position.

16. The method of claim 15, wherein $n_{SRS}$ is calculated by $n_{SRS} = n_f \times L + k$, for 2 ms SRS periodicity in a TDD system,
  where $n_f$ is the system frame number, L is $2*N_{sp}$ being the number of downlink and uplink switch points within a radio frame, and k can be 0, 1, 2 or 3.

17. The method of claim 15, further comprising:
  calculating a frequency-domain increment to be updated for the SRS according to the obtained $n_{SRS}$; and
  calculating a frequency position index for transmitting the SRS according to the obtained frequency-domain increment.

18. The method of claim 17, wherein the frequency-domain increment is calculated by:

$$F_b(n_{SRS}) = \begin{cases} (N_b/2)\left[\dfrac{n_{SRS} \bmod \prod_{b'=b_{hop}}^{b} N_{b'}}{\prod_{b'=b_{hop}}^{b-1} N_{b'}} + \dfrac{n_{SRS} \bmod \prod_{b'=b_{hop}}^{b} N_{b'}}{2\prod_{b'=b_{hop}}^{b-1} N_{b'}}\right] & \text{if } N_b \text{ even} \\ \lfloor N_b/2 \rfloor \left\lfloor n_{SRS} \Big/ \prod_{b'=b_{hop}}^{b-1} N_{b'} \right\rfloor & \text{if } N_b \text{ odd,} \end{cases}$$

where $N_b$ is obtained according to a Radio Resource Control (RRC) signaling and $b_{hop}$ denotes SRS frequency-hopping parameter, $0 \leq b_{hop} \leq 3$, which is provided by a higher-layer parameter.

19. The method of claim 18, wherein the frequency position index is calculated by:

$$n_b = \begin{cases} \lfloor 4n_{RRC}/m_{SRS,b} \rfloor & b \leq b_{hop} \\ \{F_b(n_{SRS}) + \lfloor 4n_{RRC}/m_{SRS,b} \rfloor\} \bmod N_b & \text{else,} \end{cases}$$

where $m_{SRS,b}$ is obtained by reading the RRC signaling and $n_{RRC}$ is given by a higher-layer parameter.

20. The method of claim 19, wherein the frequency-domain starting position $k_0$ is calculated by:

$$k_0 = k_0' + \sum_{b=0}^{B_{SRS}} 2M_{sc,b}^{RS} n_b$$

$$k_0' = (\lfloor N_{RB}^{UL}/2 \rfloor - m_{SRS,0}/2)N_{SC}^{RB} + k_{TC}$$

$$M_{sc,b}^{RS} = m_{SRS,b} N_{sc}^{RB}/2,$$

where $M_{SRS,0}$ obtained from a cell-specific SRS parameter, $N_{sc}^{RB}$ denotes resource block size in the frequency domain, expressed as a number of subcarriers, $k_{TC} \in \{0, 1\}$ denotes a Comb parameter, and $N_{RB}^{UL}$ denotes uplink bandwidth configuration, expressed in multiples of $N_{sc}^{RB}$.

21. The method of claim 16, wherein the identifying step comprising:
  indexing a first SC-FDMA symbol for transmitting the SRS in a radio frame as k=0;

indexing a second SC-FDMA symbol for transmitting the SRS in a radio frame as k=1;

indexing a third SC-FDMA symbol for transmitting the SRS in a radio frame as k=2; and indexing a fourth SC-FDMA symbol for transmitting the SRS in a radio frame as k=3.

22. A base station for receiving an uplink Sounding Reference Signal (SRS), the base station comprising:
- an SRS sequence generator for generating an SRS sequence;
- a physical resource mapper for transmitting the SRS; and
- a receiver for receiving the SRS at a determined frequency-domain starting position,
- wherein the physical resource mapper is adapted to sequentially perform steps of:
  - a) identifying a number of downlink and uplink switch points within a radio frame, $N_{sp}$, and a system frame number $n_f$;
  - b) calculating a value of $n_{SRS}$ according to the number of downlink and uplink switch points within a radio frame $N_{sp}$, and the system frame number $n_f$ for transmitting the SRS; and
  - c) determining a frequency-domain starting position of the SRS based on $n_{SRS}$.

23. The base station of claim 22, wherein $n_{SRS}$ is calculated by $n_{SRS}=n_f \times L+k$, for 2 ms SRS periodicity in a TDD system, where $n_f$ is the system frame number, L is $2*N_{sp}$ being the number of downlink and uplink switch points within a radio frame, k can be 0, 1, 2 or 3.

24. The base station of claim 22, the physical resource mapper further comprising:
- calculating a frequency-domain increment to be updated for the SRS according to the obtained $n_{SRS}$; and
- calculating a frequency position index for transmitting the SRS according to the obtained frequency-domain increment.

25. The base station of claim 24, wherein the frequency-domain increment is calculated by:

$$F_b(n_{SRS}) = \begin{cases} (N_b/2)\left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd,} \end{cases}$$

where $N_b$ is obtained according to a Radio Resource Control (RRC) signaling and $b_{hop}$ denotes SRS frequency-hopping parameter, $0 \le b_{hop} \le 3$, which is provided by a higher-layer parameter.

26. The base station of claim 25, wherein the frequency position index is calculated by:

$$n_b = \begin{cases} \lfloor 4n_{RRC}/m_{SRS,b} \rfloor & b \le b_{hop} \\ \{F_b(n_{SRS}) + \lfloor 4n_{RRC}/m_{SRS,b} \rfloor\} \bmod N_b & \text{else,} \end{cases}$$

where $m_{SRS,b}$ is obtained by reading the RRC signaling and $n_{RRC}$ is given by a higher-layer parameter.

27. The base station of claim 26, wherein the frequency-domain starting position $k_0$ is calculated by:

$$k_0 = k'_0 + \sum_{b=0}^{B_{SRS}} 2M_{sc,b}^{RS} n_b$$

$$k'_0 = (\lfloor N_{RB}^{UL}/2 \rfloor - m_{SRS,0}/2)N_{SC}^{RB} + k_{TC}$$

$$M_{sc,b}^{RS} = m_{SRS,b} N_{sc}^{RB}/2,$$

where $m_{SRS,0}$ obtained from a cell-specific SRS parameter, $N_{sc}^{RB}$ denotes resource block size in the frequency domain, expressed as a number of subcarriers, $k_{TC} \in \{0, 1\}$ denotes a Comb parameter, and $N_{RB}^{UL}$ denotes uplink bandwidth configuration, expressed in multiples of $N_{sc}^{RB}$.

28. The base station of claim 23, wherein the physical resource mapper further performs:

indexing a first SC-FDMA symbol for transmitting the SRS in a radio frame as k=0, indexing a second SC-FDMA symbol for transmitting the SRS in a radio frame as k=1;

indexing a third SC-FDMA symbol for transmitting the SRS in a radio frame as k=2; and indexing a fourth SC-FDMA symbol for transmitting the SRS in a radio frame as k=3.

* * * * *